(12) United States Patent
Roy et al.

(10) Patent No.: US 9,774,386 B2
(45) Date of Patent: Sep. 26, 2017

(54) DISTRIBUTED SIMULCAST ARCHITECTURE

(71) Applicant: E.F. Johnson Company, Irving, TX (US)

(72) Inventors: Arindam Roy, Plano, TX (US); Larry Emmett, Dallas, TX (US)

(73) Assignee: E.F. Johnson Company, Irving, TX (US)

( * ) Notice: Subject to any disclaimer, the term of this patent is extended or adjusted under 35 U.S.C. 154(b) by 15 days.

(21) Appl. No.: 14/217,150

(22) Filed: Mar. 17, 2014

(65) Prior Publication Data

US 2014/0273916 A1 Sep. 18, 2014

Related U.S. Application Data

(60) Provisional application No. 61/790,588, filed on Mar. 15, 2013.

(51) Int. Cl.
| | |
|---|---|
| *H04M 11/04* | (2006.01) |
| *H04B 7/26* | (2006.01) |
| *H04B 7/155* | (2006.01) |

(52) U.S. Cl.
CPC ....... *H04B 7/2606* (2013.01); *H04B 7/15507* (2013.01)

(58) Field of Classification Search
CPC .. G06F 11/181; G06F 11/182; H04L 41/0659; H04L 41/0869; H04L 41/0893; H04W 64/00; H04W 36/12

(Continued)

(56) References Cited

U.S. PATENT DOCUMENTS

| | | |
|---|---|---|
| 4,870,408 A | 9/1989 | Zdunek et al. |
| 5,214,789 A | 5/1993 | George |

(Continued)

OTHER PUBLICATIONS

Telecommunications Industry Association (TIA) with Electronic Industries Alliance (EIA), TIA/EIA Telecommunications Systems Bulletin, APCO Project 25—Trunking Overview (TSB102.AABA), Apr. 1995, Telecommunications Industry Association (TIA), Arlington, VA (12 pages).

(Continued)

*Primary Examiner* — Joseph Arevalo
(74) *Attorney, Agent, or Firm* — Gardere Wynne Sewell LLP

(57) ABSTRACT

A system and method for providing communication in a distributed LMR system architecture is provided herein, wherein the system includes a plurality of LMR subsystems interconnected by a data network. In some embodiments, a subsystem may include a distributed simulcast architecture comprising a plurality of LMR sites, each site having a subsystem controller and a plurality of repeaters. In one embodiment, one subsystem controller operates in an active mode and the remaining subsystem controllers operate in standby to provide redundancy. The repeaters include integrated voter comparator and simulcast controller functionality and circuitry. In some embodiments, the repeaters are operable in an active or standby mode, wherein repeaters in the active mode perform voter comparator and simulcast controller functionality. The distributed simulcast architecture provides simulcast controller and voter comparator redundancy, network failure redundancy, and site redundancy.

22 Claims, 18 Drawing Sheets

(58) Field of Classification Search
USPC ...... 455/452.1, 435.3, 436, 435, 404.1, 401, 455/444, 448
See application file for complete search history.

(56) References Cited

U.S. PATENT DOCUMENTS

| | | | |
|---|---|---|---|
| 5,293,638 A | 3/1994 | Sasuta et al. | |
| 5,420,909 A | 5/1995 | Ng et al. | |
| 5,850,444 A | 12/1998 | Rune | |
| 5,901,341 A | 5/1999 | Moon et al. | |
| 6,141,347 A | 10/2000 | Shaughnessy et al. | |
| 6,545,995 B1 | 4/2003 | Kinnunen et al. | |
| 6,744,746 B1 | 6/2004 | Bartelme | |
| 6,754,224 B1 | 6/2004 | Murphy | |
| 6,771,703 B1* | 8/2004 | Oguz | G11B 27/034 375/240.03 |
| 6,941,457 B1 | 9/2005 | Gundavelli et al. | |
| 7,056,217 B1 | 6/2006 | Pelkey et al. | |
| 7,184,790 B2 | 2/2007 | Dorenbosch et al. | |
| 7,221,660 B1 | 5/2007 | Simonson et al. | |
| 7,636,339 B2 | 12/2009 | Shaffer et al. | |
| 7,764,633 B2 | 7/2010 | Marque-Pucheu | |
| 7,929,475 B2 | 4/2011 | Simonson et al. | |
| 7,970,425 B2 | 6/2011 | Balachandran et al. | |
| 8,059,574 B2 | 11/2011 | Roy et al. | |
| 8,160,076 B1 | 4/2012 | Aggarwal et al. | |
| 8,255,684 B2 | 8/2012 | Benshetler et al. | |
| 8,483,114 B2 | 7/2013 | Roy et al. | |
| 8,694,774 B2 | 4/2014 | Benshetler et al. | |
| 9,148,421 B2 | 9/2015 | Benshetler et al. | |
| 2001/0010689 A1* | 8/2001 | Awater | H04W 16/14 370/344 |
| 2002/0114302 A1 | 8/2002 | McDonald et al. | |
| 2002/0155839 A1 | 10/2002 | Nisbet | |
| 2003/0016834 A1 | 1/2003 | Blanco et al. | |
| 2003/0058858 A1 | 3/2003 | Berlyoung et al. | |
| 2003/0063569 A1 | 4/2003 | Kalliokulju et al. | |
| 2003/0095510 A1 | 5/2003 | Dorenbsoch | |
| 2004/0070515 A1* | 4/2004 | Burkley | G01S 5/0027 340/8.1 |
| 2005/0180448 A1 | 8/2005 | Kobayashi | |
| 2005/0198359 A1 | 9/2005 | Basani et al. | |
| 2005/0281208 A1 | 12/2005 | Dorenbosch et al. | |
| 2005/0282590 A1 | 12/2005 | Haparnas | |
| 2006/0160562 A1 | 7/2006 | Davis et al. | |
| 2006/0211443 A1 | 9/2006 | Wegman | |
| 2006/0262800 A1 | 11/2006 | Martinez et al. | |
| 2007/0072619 A1 | 3/2007 | Wei et al. | |
| 2007/0104121 A1 | 5/2007 | Shaffer et al. | |
| 2007/0242670 A1 | 10/2007 | Simonson et al. | |
| 2007/0259692 A1 | 11/2007 | Venkatachalam | |
| 2007/0263798 A1 | 11/2007 | Dewing et al. | |
| 2007/0293159 A1 | 12/2007 | Etelapera | |
| 2008/0056466 A1 | 3/2008 | Nishimura | |
| 2008/0076425 A1* | 3/2008 | Khetawat | H04W 88/12 455/436 |
| 2008/0114239 A1* | 5/2008 | Randall | G01S 7/52073 600/437 |
| 2008/0123650 A1 | 5/2008 | Bhaskar | |
| 2008/0144644 A1 | 6/2008 | Allan et al. | |
| 2009/0024845 A1 | 1/2009 | Benshetler et al. | |
| 2009/0175209 A1 | 7/2009 | Roy et al. | |
| 2010/0020735 A1 | 1/2010 | Roy et al. | |
| 2010/0162036 A1* | 6/2010 | Linden | G06F 11/181 714/4.11 |
| 2010/0169446 A1* | 7/2010 | Linden | G06F 11/181 709/206 |
| 2010/0303033 A1 | 12/2010 | Shahar et al. | |
| 2011/0034170 A1* | 2/2011 | Zhong | H04W 48/18 455/435.3 |
| 2012/0002588 A1 | 1/2012 | Roy et al. | |
| 2012/0083307 A1 | 4/2012 | Roy et al. | |
| 2013/0072165 A1 | 3/2013 | Rondeau et al. | |
| 2013/0165134 A1 | 6/2013 | Touag et al. | |
| 2013/0215819 A1 | 8/2013 | Ji et al. | |
| 2013/0294323 A1 | 11/2013 | Roy et al. | |
| 2013/0337822 A1* | 12/2013 | Rubin | H04W 72/12 455/452.1 |
| 2014/0357234 A1 | 12/2014 | Sullivan | |
| 2015/0057040 A1 | 2/2015 | Kuehner | |
| 2016/0036624 A1 | 2/2016 | Roy et al. | |
| 2016/0100294 A1 | 4/2016 | Ruelke et al. | |
| 2016/0135207 A1 | 5/2016 | Bane et al. | |

OTHER PUBLICATIONS

Office Action dated Dec. 17, 2010 issued in U.S. Appl. No. 11/940,936 (12 pages).

Final Office Action dated Jul. 1, 2011 issued in U.S. Appl. No. 11/940,936 (16 pages).

Telecommunications Industry Association (TIA) with Electronic Industries Alliance (EIA), TIA/EIA Standard: Project 25—Trunking Control Channel Messages New Technology Standards Project Digital Radio Technical Standards (ANSI/TIA/EIA-102.AABC), May 2000, Telecommunications Industry Association (TIA), Arlington, VA (150 pages).

Telecommunications Industry Association (TIA) with Electronic Industries Alliance (EIA), TIA/EIA Standard: Project 25—Trunking Control Channel Messages, Addendum 1, SNDCP Trunking Control Channel Messages (ANSI/TIA/EIA102.AABC-1), Sep. 2001, Telecommunications Industry Association (TIA), Arlington, VA (11 pages).

Telecommunications Industry Association (TIA) with Electronic Industries Alliance (EIA), TIA Standard: Project 25—Trunking Control Channel Messages, Addendum 2—Multiband Operations, New Technology Standards Project Digital Radio Technical Standards (ANSI/TIA-102.AABC-2), Dec. 2002, Telecommunications Industry Association (TIA), Arlington, VA (39 pages).

2nd Notice of Allowance dated Jul. 1, 2011 issued in U.S. Appl. No. 11/937,963 (7 pages).

1st Notice of Allowance dated Mar. 4, 2011 issued in U.S. Appl. No. 11/937,963 (5 pages).

Office Action dated Oct. 15, 2010 issued in U.S. Appl. No. 11/937,963 (15 pages).

U.S. Appl. No. 61/790,588, filed Mar. 15, 2013; first-named inventor: Arindam Roy.

Copending U.S. Appl. No. 14/200,812, filed Mar. 7, 2014, first-named inventor: Jeffery E. Benshetler.

Final Office Action dated Sep. 16, 2015, in U.S. Appl. No. 13/937,005.

Notice of Allowance dated Jan. 13, 2016 in U.S. Appl. No. 13/937,005.

Notice of Allowance dated Nov. 19, 2013 in U.S. Appl. No. 13/595,981.

Notice of Allowance dated Mar. 12, 2013 in U.S. Appl. No. 13/251,895.

Notice of Allowance dated Apr. 19, 2016 in U.S. Appl. No. 13/937,005.

Notice of Allowance dated May 26, 2015 in U.S. Appl. No. 14/200,812.

Notice of Allowance dated Jul. 29, 2016 in U.S. Appl. No. 13/937,005.

Office Action dated Dec. 10, 2014 in U.S. Appl. No. 14/200,812.
Office Action dated Mar. 27, 2015, in U.S. Appl. No. 13/937,005.
Office Action dated May 20, 2013 in U.S. Appl. No. 13/595,981.
Office Action dated Sep. 19, 2012 in U.S. Appl. No. 13/251,895.
Preliminary Amendent dated May 10, 2016, in U.S. Appl. No. 14/935,270.

Response to Final Office Action, dated Nov. 16, 2015, in U.S. Appl. No. 13/937,005.

Response to Non-Final Office Action, dated Dec. 19, 2012, in U.S. Appl. No. 13/251,895.

Response to Office Action, dated Oct. 21, 2013, in U.S. Appl. No. 13/595,981.

Response to Office Action, dated Apr. 8, 2015, in U.S. Appl. No. 14/200,812.

(56) References Cited

OTHER PUBLICATIONS

Response to Office Action, dated Aug. 27, 2015, in U.S. Appl. No. 13/937,005.
Terminal Disclaimer dated Oct. 21, 2013, in U.S. Appl. No. 13/595,981.
Terminal Disclaimer dated Dec. 2, 2015, in U.S. Appl. No. 13/937,005.
Terminal Disclaimer dated Apr. 8, 2015, in U.S. Appl. No. 14/200,812.
U.S. Appl. No. 60/950,868, filed Jul. 19, 2007; first-named inventor: Benshetler.
U.S. Appl. No. 62/076,473, filed Nov. 6, 2014; first-named inventor: Bane.
U.S. Appl. No. 60/950,870, filed Jul. 19, 2007; first-named inventor: Benshetler.
U.S. Appl. No. 60/963,131, filed Aug. 2, 2007; first-named inventor: Benshetler.
Office Action dated Jun. 5, 2017 in U.S. Appl. No. 15/494,391.
Copending U.S. Appl. No. 15/641,747, filed Jul. 5, 2017; first-named inventor: Bane.

\* cited by examiner

DISTRIBUTED SIMULCAST ARCHITECTURE

CROSS-REFERENCE TO RELATED APPLICATIONS

Pursuant to 35 U.S.C. §119(e), this application claims priority from, and hereby incorporates by reference for all purposes, U.S. Provisional Patent Application Ser. No. 61/790,588, entitled "Distributed Simulcast Architecture," filed Mar. 15, 2013, and naming Arindam Roy and Larry Emmett as inventors.

FIELD

The present disclosure relates generally to communication systems. More specifically, but not by way of limitation, the present disclosure relates to a system and method for providing communication in a distributed simulcast architecture in a Land Mobile Radio (LMR) communication system.

BACKGROUND

The statements in this section merely provide background information related to the present disclosure and may not constitute prior art.

Land Mobile Radio (LMR) systems are deployed by organizations requiring instant communication between geographically dispersed and mobile personnel. Current LMR systems can be configured to provide for radio communications between one or more sites and subscriber radio units in the field. A subscriber radio unit (hereinafter "radio") may be a mobile unit or a portable unit. LMR systems can be as simple as two radio units communicating between themselves over preset channels, or they can be complex systems that include hundreds of radio units and multiple sites. Typical users of LMR systems include police departments, fire departments, medical personnel, security personnel, EMS, and the military.

Conventional and trunking LMR system architecture may include multiple LMR sites, each utilizing various equipment including, for example, dedicated site controllers, repeaters, voter comparator and simulcast controllers. Specifically, in simulcast system architecture, a prime site is deployed that hosts the site controllers, simulcast controllers and voter comparators. As the LMR system expands, additional equipment is needed, which becomes increasingly expensive to provide and maintain. Furthermore, each site in the LMR system is often controlled by equipment located at one of the sites comprising the LMR system or by the equipment located at the prime site. Accordingly, when such equipment fails, corresponding portions of the LMR system also fail. As such, conventional and trunking LMR system architecture lacks redundancy and, therefore, is often subject to single points of failure, thereby compromising the integrity of the LMR system architecture.

SUMMARY

In one embodiment, the present disclosure provides a system for providing communication in a distributed LMR system architecture, the distributed LMR system architecture comprising one or more subsystems in communication with a data network, the system comprising: one or more LMR sites comprising at least one of the one or more subsystems; one or more subsystem controllers disposed at each of the one or more LMR sites comprising the at least one subsystem, each subsystem controller having at least an active mode and a standby mode, wherein at least one subsystem controller is operable in the active mode to control communication between the one or more LMR sites in the at least one subsystem; and one or more repeaters disposed at each of the plurality of sites in the at least one subsystem, each of the repeaters operable to provide a communication channel, wherein each repeater has at least an active mode and a standby mode, and wherein at least one repeater is operable in the active mode to perform at least one of a simulcast controller operation and a voter comparator operation.

In another embodiment, the present disclosure provides a method for providing communication in a distributed land mobile radio (LMR) system architecture, the distributed LMR system architecture comprising one or more subsystems in communication with a data network, the method comprising: providing a subsystem controller in each of a plurality of LMR sites comprising one of the subsystems, each subsystem controller having at least an active mode and a standby mode; operating one of the subsystem controllers in the active mode to control communication between the plurality of LMR sites; operating the remaining subsystem controllers in the standby mode; providing a plurality of repeaters at each of the plurality of LMR sites comprising the subsystem, each repeater having at least an active mode and a standby mode; operating at least one of the repeaters in the active mode to perform at least one of a simulcast controller operation and a voter comparator operation; and operating the remaining repeaters in the standby mode.

Further embodiments and apparatuses, including other areas of applicability, will become apparent from the description provided herein. It should be understood that the description and specific examples are intended for purposes of illustration only and are not intended to limit the scope of the present disclosure in any manner

BRIEF DESCRIPTION OF THE DRAWINGS

For a more complete understanding of various embodiments of the present invention and the advantages thereof, reference is now made to the following brief description, taken in connection with the accompanying drawings and detailed description, wherein like reference numerals represent like parts, and in which.

DETAILED DESCRIPTION OF THE DRAWINGS

In the following detailed description and accompanying drawings, numerous specific details are set forth to provide a thorough understanding of the present disclosure. However, those skilled in the art will appreciate that the present disclosure may be practiced, in some instances, without such specific details. In other instances, well-known elements have been illustrated in schematic or block diagram form in order not to obscure the present disclosure in unnecessary detail. Additionally, for the most part, specific details, and the like, have been omitted inasmuch as such details are not considered necessary to obtain a complete understanding of the present disclosure, and are considered to be within the purview of persons of ordinary skill in the relevant art.

It is further noted that, unless indicated otherwise, all functions described herein may be performed in hardware or as software instructions for enabling a computer, radio, or other device to perform predetermined operations, where the software instructions are embodied on a computer readable storage medium, such as RAM, a hard drive, flash memory, or other type of computer readable storage medium known to a person of ordinary skill in the art. In certain embodiments, the predetermined operations of the computer, radio, or other device are performed by a processor such as a computer or an electronic data processor in accordance with code such as computer program code, software, firmware, and, in some embodiments, integrated circuitry that is coded to perform such functions. Furthermore, it should be understood that various operations described herein as being performed by a user may be operations manually performed by the user, or may be automated processes performed either with or without instruction provided by the user.

Figure 1:
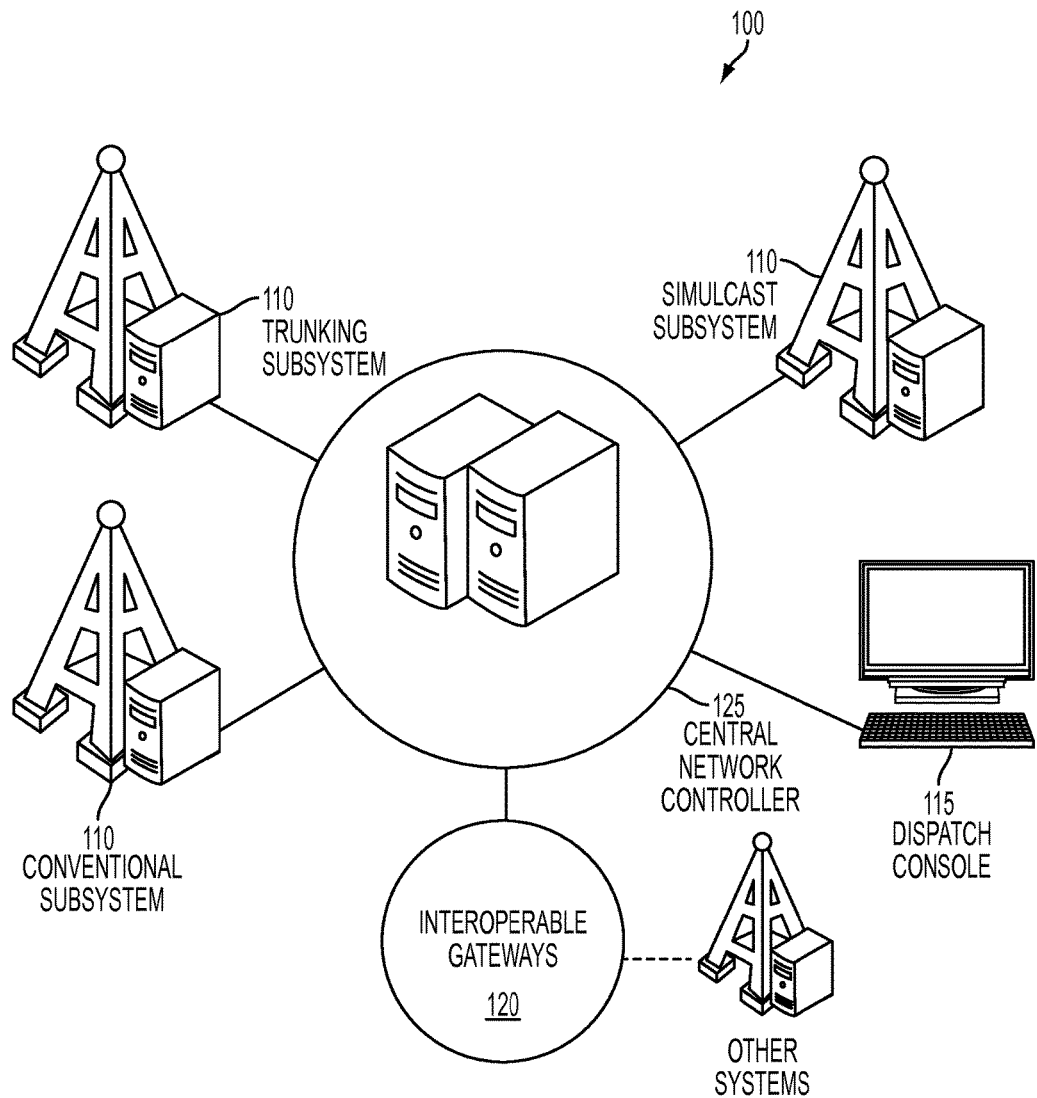
FIG. 1 illustrates an example embodiment of a centralized LMR architecture.

An LMR system may employ a centralized architecture whereby various LMR subsystems are connected by a central network controller and associated network equipment. FIG. 1 illustrates an example of a centralized LMR architecture 100, which includes various LMR subsystems 110, dispatch stations 115, and gateway equipment 120 connected by a central network controller 125. The central network controller 125 includes equipment for operating and controlling each of the various LMR subsystems 110, dispatch stations 115, and gateway equipment 120. The various LMR subsystems 110 may include any of a conventional LMR system, trunking LMR system, hybrid LMR system, or wide area systems such as a simulcast LMR system or multicast LMR system. Examples of such LMR systems are briefly discussed below with reference to FIGS. 2-5.

Figure 2:
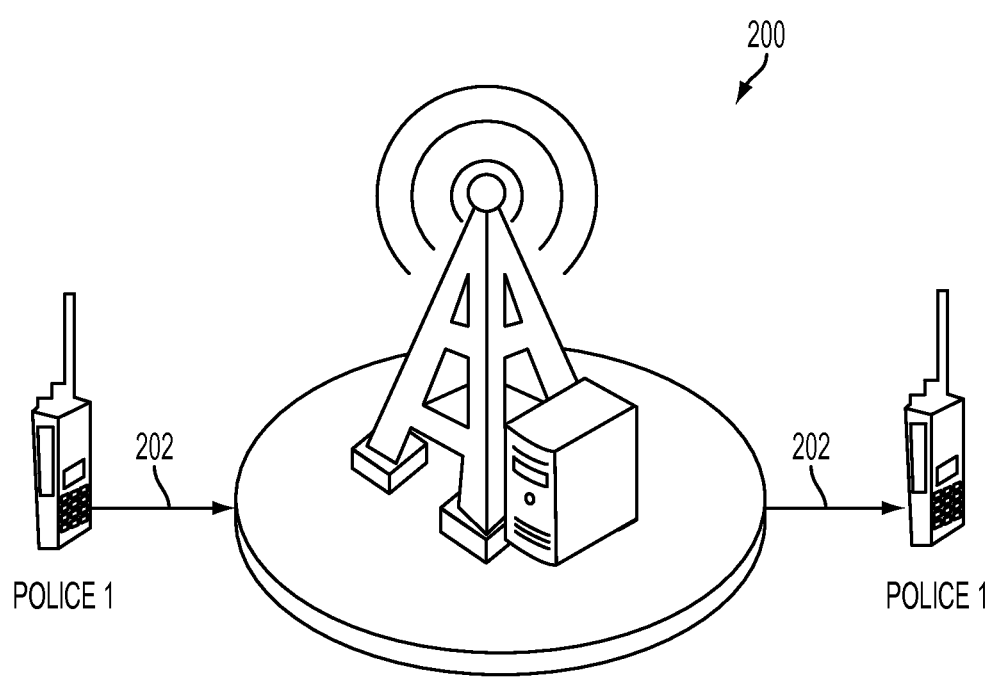
FIG. 2 illustrates an example embodiment of a conventional LMR system.

FIG. 2 illustrates an example of a conventional LMR system 200. Conventional systems are typically deployed in regions covering large geographic areas and/or comprising a moderate quantity of users. In a conventional system, a dedicated repeater channel is provided for system user groups, and the user chooses the channel or channels on which he wishes to communicate. Often, system user groups are organized based on responsibility, such as Fire, Police, EMS, Public Works, and Mutual Aid. In most cases, each of these groups has a corresponding dedicated repeater channel 202, which provides a frequency for communicating a call.

Figure 3:
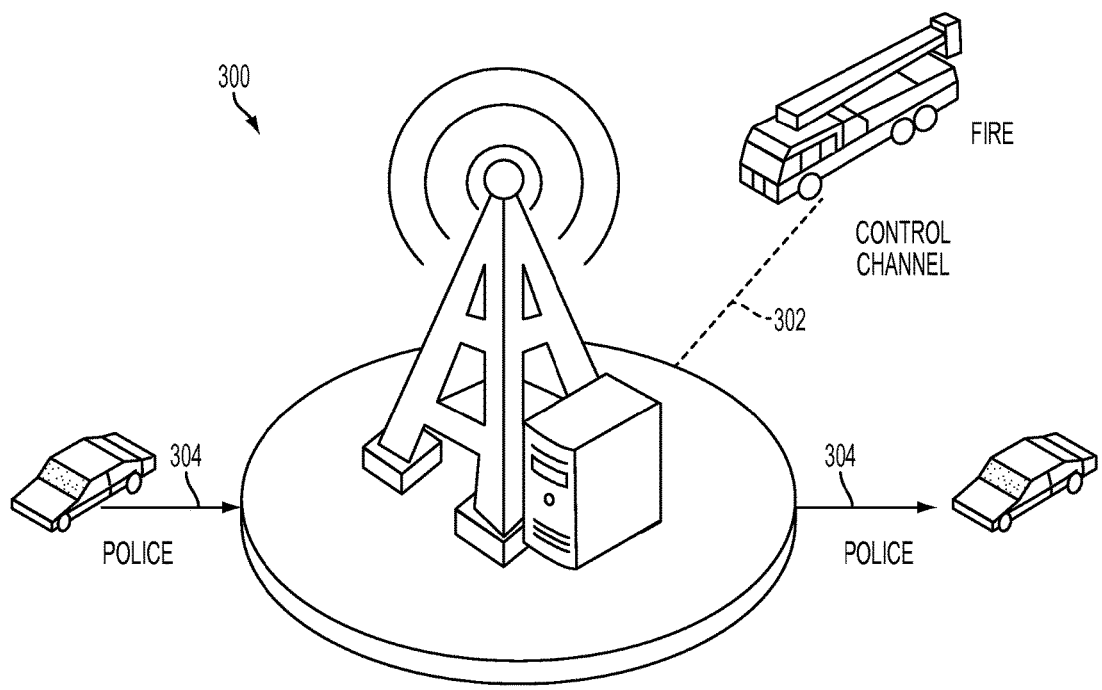
FIG. 3 illustrates an example embodiment of a trunked LMR system.

FIG. 3 illustrates an example of a trunked LMR system 300. Trunked systems are typically deployed in regions covering moderate geographical areas and/or comprising a large quantity of users. Trunked systems have a shared pool of repeater channels for use among system user groups. The repeater channels at each site are divided into a control channel 302 and multiple voice channels 304. The control channel 302 registers a radio into the system and dynamically coordinates radio talkgroup Push-to-Talk (PTT) with an available voice channel.

In a trunked radio system, system talkgroups are often organized based on responsibility, such as Fire, Police, EMS, Public Works, and Mutual Aid. The user selects the talkgroup with which he wishes to communicate, and the trunked system then allocates the radio channel used for the voice transmission. For LMR systems having multiple groups with access to multiple channels at each site, a trunked system may be implemented to increase the system's efficiency.

Figure 4:
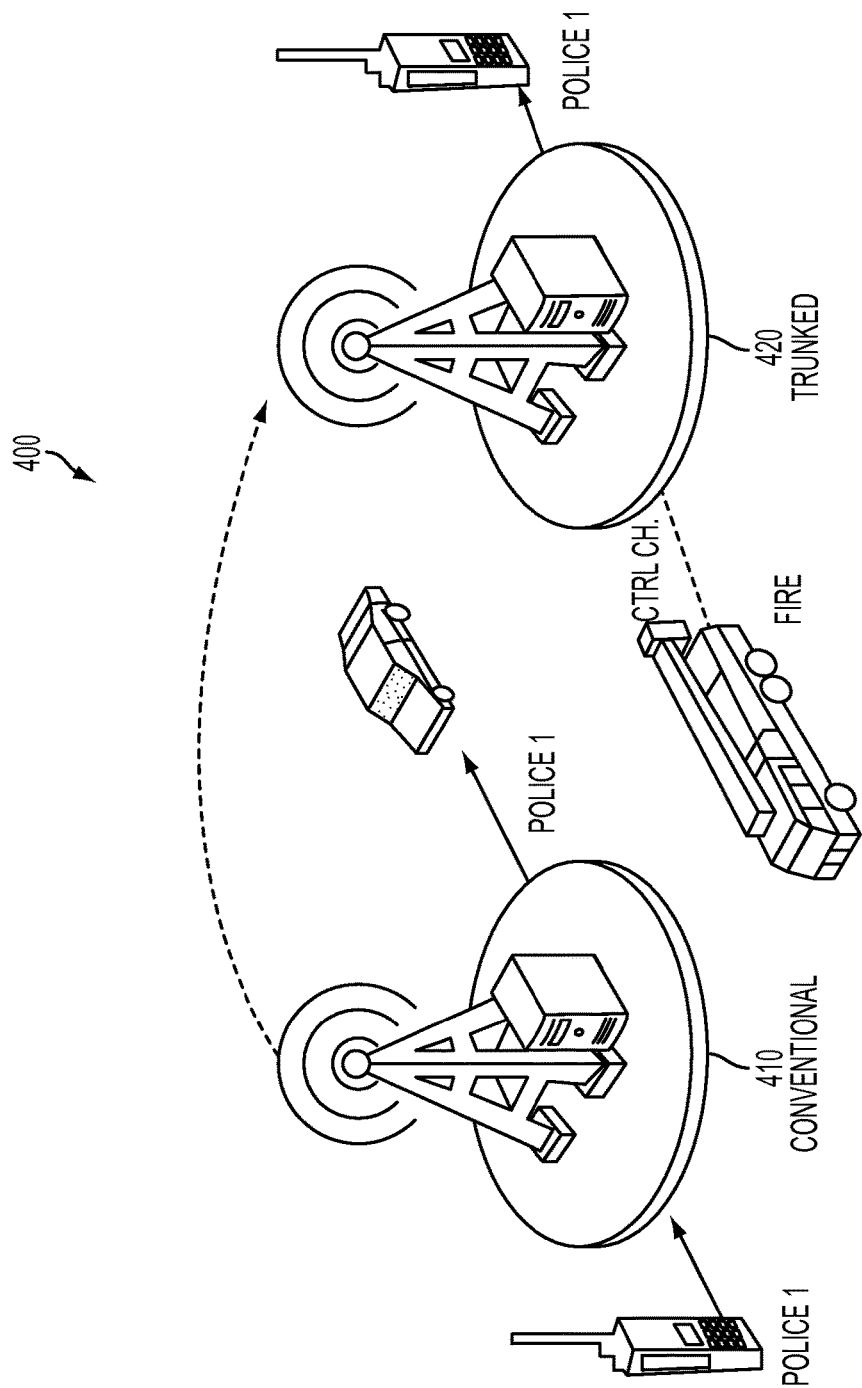
FIG. 4 illustrates an example embodiment of a hybrid LMR system.

A hybrid system combines conventional and trunked repeater channels into a single system. In hybrid systems, users can be organized functionally for either the conventional or trunked part of the system, as needed. FIG. 4 illustrates an example embodiment of a hybrid LMR system 400, which includes a conventional site 410 and a trunked site 420.

Figure 5:
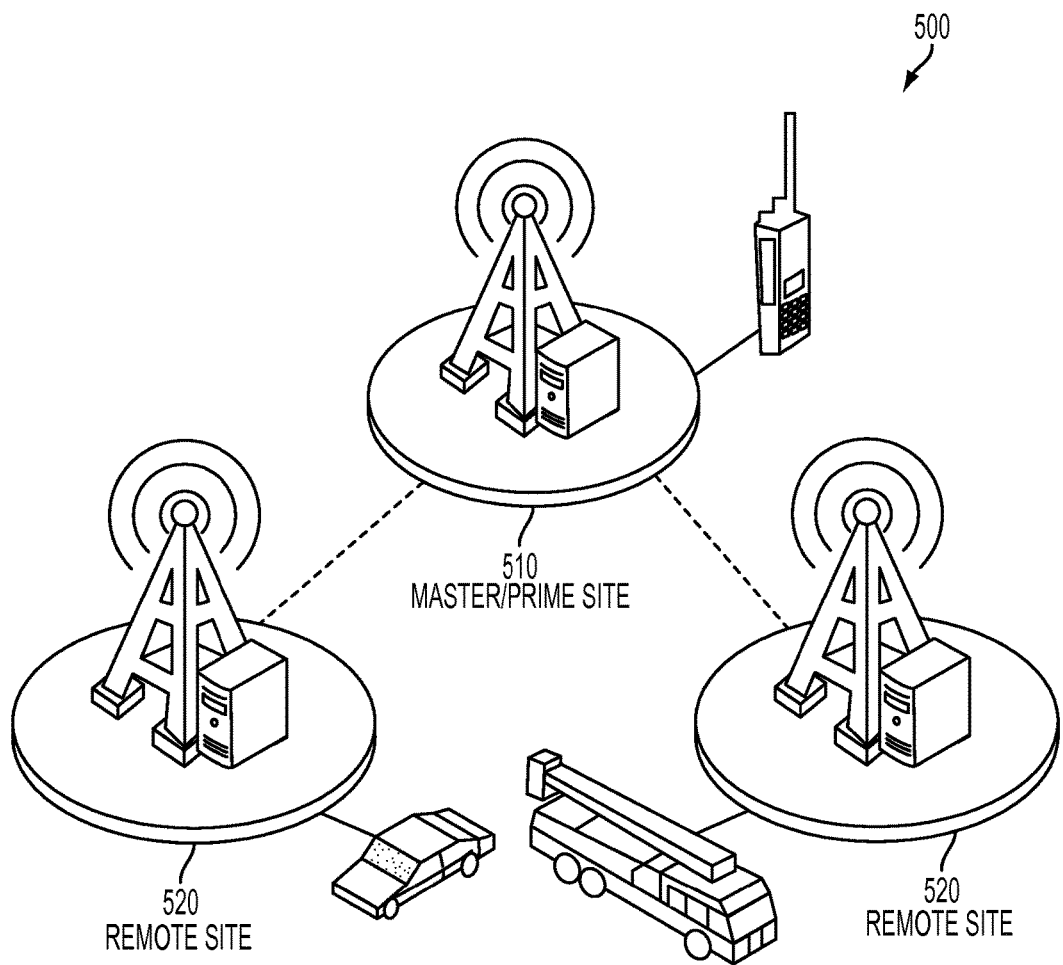
FIG. 5 illustrates an example embodiment of a simulcast LMR system.

In addition to the foregoing, LMR system types may include wide area systems, which, in some embodiments, are designed to enable radios to move throughout an area without their users needing to change channels while roaming. A simulcast system is an example of a wide area system. An example of a simulcast system 500 is illustrated in FIG. 5. The simulcast system 500 includes a single master site 510 (also referred to herein as a prime site) and multiple radio sites 520. The master site 510 synchronizes the system timing so that calls are transmitted simultaneously to all sites for a given repeater channel. Thus, a call is transmitted simultaneously to all sites at the same frequency. This synchronization reduces the quantity of frequencies needed for the system and simplifies frequency coordination.

Another example of a wide area LMR system is a multicast system. In multicast systems, different transmitters within adjacent geographic areas communicate on different radio channel frequencies. The multicast system switches the user to the proper channel automatically. The multicast system configuration offers similar coverage advantages of a simulcast system at a reduced cost. However, multicast systems require multiple frequencies, and their users need to change mobile channels as they move between sites.

Referring again to FIG. 1, the central network controller 125 includes equipment for operating and controlling each of the various LMR subsystems 110, dispatch stations 115, and gateway equipment 120. As the LMR system 100 expands, additional capacity is needed in the network controller often requiring additional network controller equipment, which becomes increasingly expensive to provide and maintain. Furthermore, sites in the subsystems 110 may be controlled by equipment located at the central network controller 125. When such equipment fails, the LMR system 100 fails. As such, centralized LMR architecture lacks redundancy and, therefore, is often subject to single points of failure, thereby compromising the integrity of the LMR system architecture.

The present disclosure provides a system and method for providing communication in a distributed LMR system architecture. The distributed architecture eliminates the need for a central network controller and associated network equipment. Instead, the functionality of the network controller is distributed among controllers at each of the subsystems comprising the LMR system, thereby providing peer-to-peer communication over an internet protocol (IP) network.

Figure 6:
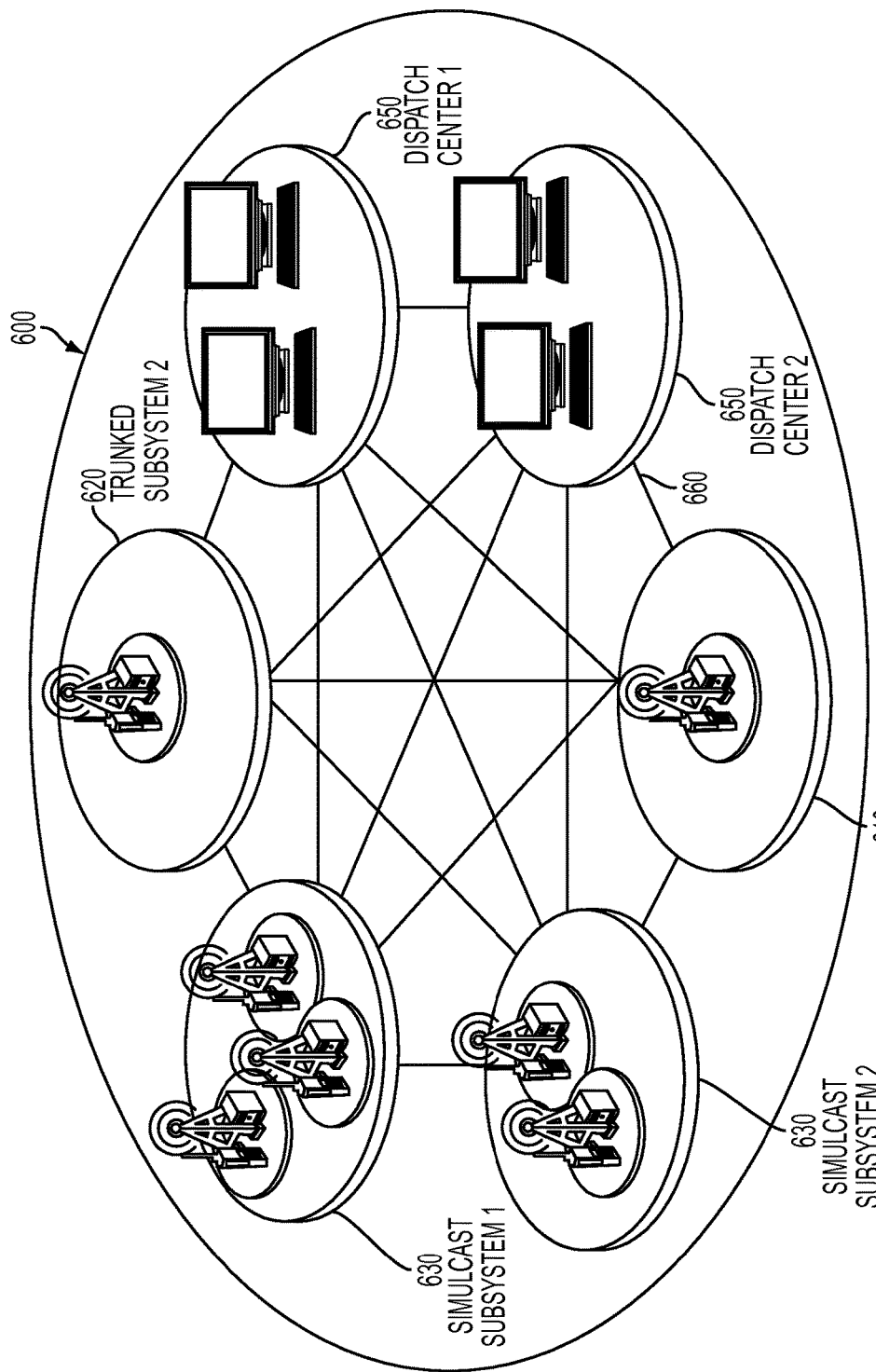
FIG. 6 illustrates an example embodiment of an LMR system incorporating a distributed architecture.

FIG. 6 illustrates an example of an LMR system 600 incorporating a distributed architecture in accordance with the present disclosure. The distributed LMR architecture 600 provided in FIG. 6 is comprised of various LMR subsystems 610-630 and dispatch stations 650 connected via IP connections 600 comprising an IP network. In the embodiment illustrated in FIG. 6, the distributed LMR architecture 600 incorporates first and second trunked subsystems 610 and 620 and simulcast subsystems 630, however, it should be appreciated that other LMR subsystems may be included, such as, for example, conventional, hybrid, multicast, or any other LMR systems discussed herein.

As mentioned above, the distributed LMR architecture 600 eliminates the central network controller and associated equipment that is typically provided with a centralized architecture, and instead distributes the functionality of the central network controller and associated equipment among subsystem controllers deployed at each of the subsystems 610-630 comprising the distributed LMR architecture 600. In some embodiments, the central network controller functionality and associated equipment may also be distributed among dispatch stations 650.

As discussed in greater detail below, the distributed LMR architecture disclosed herein incorporates repeaters, subsystem controllers, network management systems, and dispatch consoles. In some embodiments, these components are IP-based and may be managed remotely over the IP network.

Repeaters provide channels/frequencies for over-the-air communication and, in some embodiments, are equipped with circuitry to provide integrated voter comparator and simulcast controller functionality/operations.

Subsystem controllers provide interface and gateway functionality for interconnecting multiple types of LMR subsystems through a common IP network. The subsystem controllers enable dispatch console control of local repeaters, provide distributed call control and mobility management functions, and enable direct routing of calls between conventional and trunked systems and/or dispatch consoles without talkgroup patching. The distributed architecture of the disclosed system enables each subsystem controller to perform central network controller functionality for a call originating from its local subsystem, thereby eliminating the need for a dedicated central network controller. As discussed in greater detail below, providing a subsystem controller at each site in a subsystem provides multi-level redundancy of the controller functionality, and allows for communication in case of equipment or site failure.

Network management systems provide redundant, web-based, and centralized network management functionality for the infrastructure comprising the distributed architecture system, including the various LMR subsystems (e.g., conventional, trunked, etc.), subsystem controllers, and dispatch consoles. The network management systems provide management and deployment of subscriber and talkgroup records; radio administration including radio inhibit, dynamic regrouping, and radio check; agency specific management of subscriber records, talkgroup records, and reporting; and pre-defined and custom roles that restrict operator access and activity based on access credentials. The network management systems also provide real-time fault monitoring of system components, extensive reports covering system usage and user activities, real-time monitoring of user and channel activities, and full redundancy capability.

Dispatch consoles provide interoperability via direct IP connection to the LMR subsystems. In some embodiments, the dispatch consoles are IP-based and fully distributed with no requirement for central control equipment, thereby allowing extensive scalability and expansion with no single point of failure.

Figure 7:
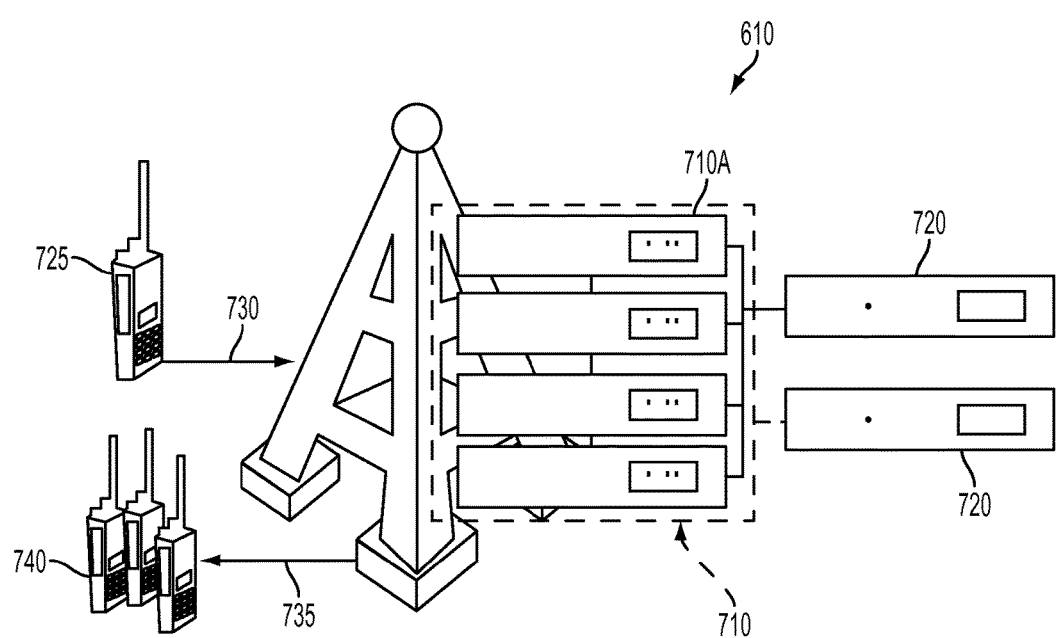
FIG. 7 illustrates an example embodiment of the first trunked LMR subsystem provided in FIG. 6.

Reference is now made to FIG. 7, which illustrates an example embodiment of the first trunked LMR subsystem 610 of FIG. 6. In the example embodiment illustrated in FIG. 7, the first trunked subsystem 610 comprises a single site trunked subsystem, however, it should be appreciated that the trunked subsystem could include multiple sites. The trunked subsystem 610 includes a plurality of repeaters 710 and two subsystem controllers 720. Each of the repeaters 710 represents a channel (a combination of transmit and receive operations), wherein one of the repeaters (e.g., 710A) operates a control channel 730, while the remaining repeaters 710 are designated for voice operation.

The trunked subsystem 610 provides redundancy by incorporating two subsystem controllers 720. One of the subsystem controllers 720 is active, and the other is on standby. If the active subsystem controller 720 fails, then the standby subsystem controller 720 becomes active to provide a fail-safe transition with no visible impact to the radio users 725 and 740. As discussed above, the local subsystem controller 720 performs call controls, thereby eliminating the need for a central controller.

In accordance with the embodiment illustrated in FIG. 7, the single site trunked subsystem 610 operates in accordance with the following example for hosting a call. A radio user 725 initiates a call through the control channel 730. The active subsystem controller 720 processes the user-initiated call and assigns a voice channel 735 for voice communication. The radio users 725 and 740 communicate with each other over the assigned voice channel 735.

Figure 8:
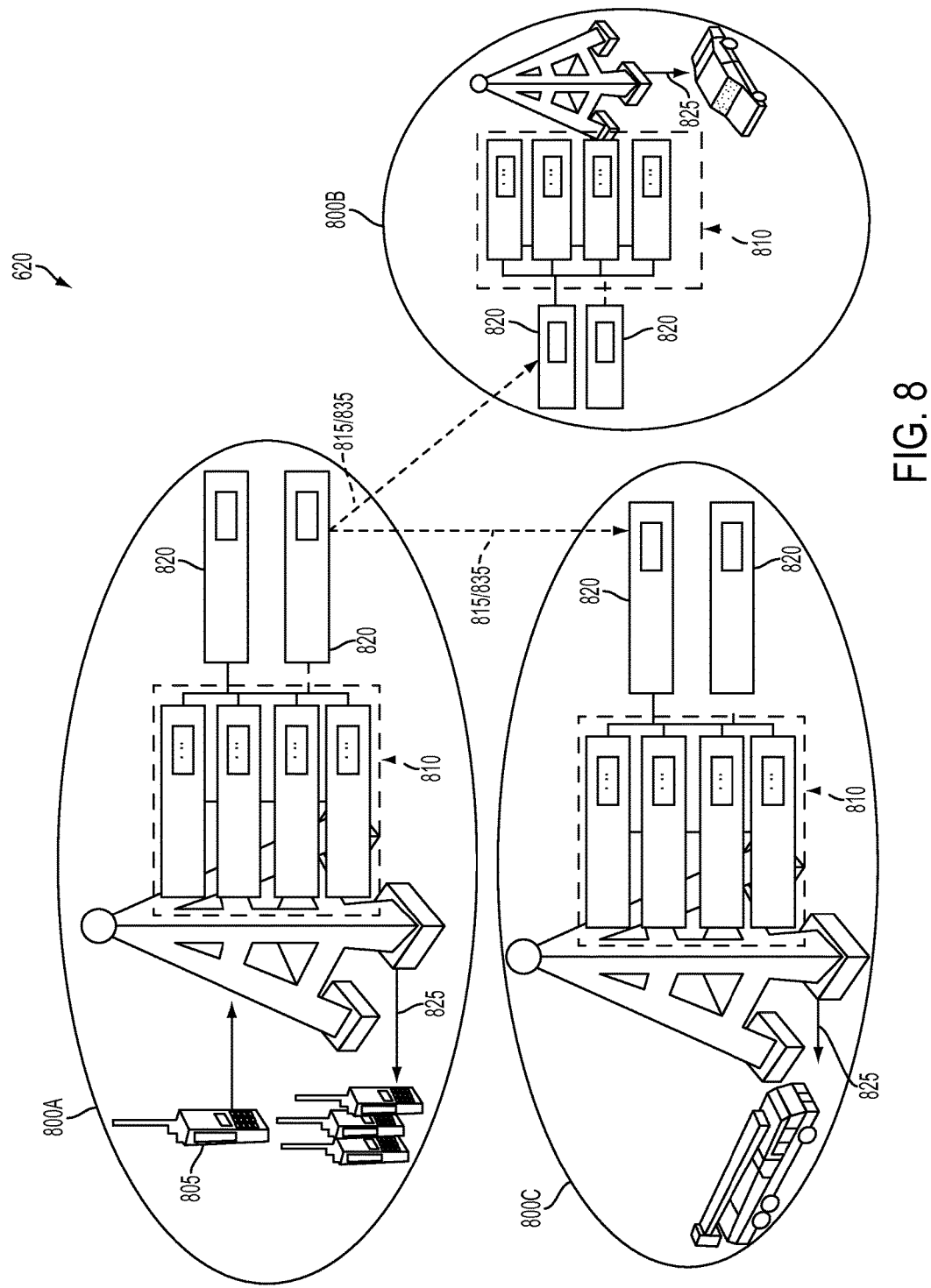
FIG. 8 illustrates an example embodiment of the second trunked LMR subsystem provided in the distributed architecture of FIG. 6.

Reference is now made to FIG. 8, which illustrates an example embodiment of the second trunked LMR subsystem 620 of FIG. 6. In the example embodiment illustrated in FIG. 8, the second trunked subsystem 620 comprises a wide area multicast trunked subsystem. The multicast trunked subsystem 620 comprises a plurality of sites 800A-800C connected with each other to form a wide area trunked system. Each of the sites 800A-800C is similar to the single trunked site discussed above with respect to FIG. 7 and, therefore, includes a plurality of repeaters 810 and two subsystem controllers 820. In some embodiments, adjacent sites in the multicast trunked subsystem 620 operate at a different frequency to ensure there is no radiofrequency (RF) interference between the sites. However, in some embodiments, frequencies may be reused in non-overlapping sites.

The sites 800A-800C are connected via their respective subsystem controllers 820, thereby eliminating the need for a central controller. The subsystem controllers 820 communicate directly with each other to setup a wide area call between interested sites. For example, a call originating from a first site (e.g., site 800A) is transferred to other interested sites (e.g., sites 800B and 800C) using the local subsystem controllers 820.

In accordance with the embodiment illustrated in FIG. 8, the multicast trunked subsystem 620 operates in accordance with the following example for hosting a call. A radio user 805 from site 800A originates a call. The active subsystem controller 820 in site 800A determines the other sites interested in the call and sends them a call notification 815. The active subsystem controller 820 located in each site 800A-800C assigns a voice channel 825 to the call. The active subsystem controller 820 in site 800A transfers the call 835 to the other subsystem controllers 820, and the radios use the assigned voice channel 825 to transmit or receive within their respective site.

Figure 9:
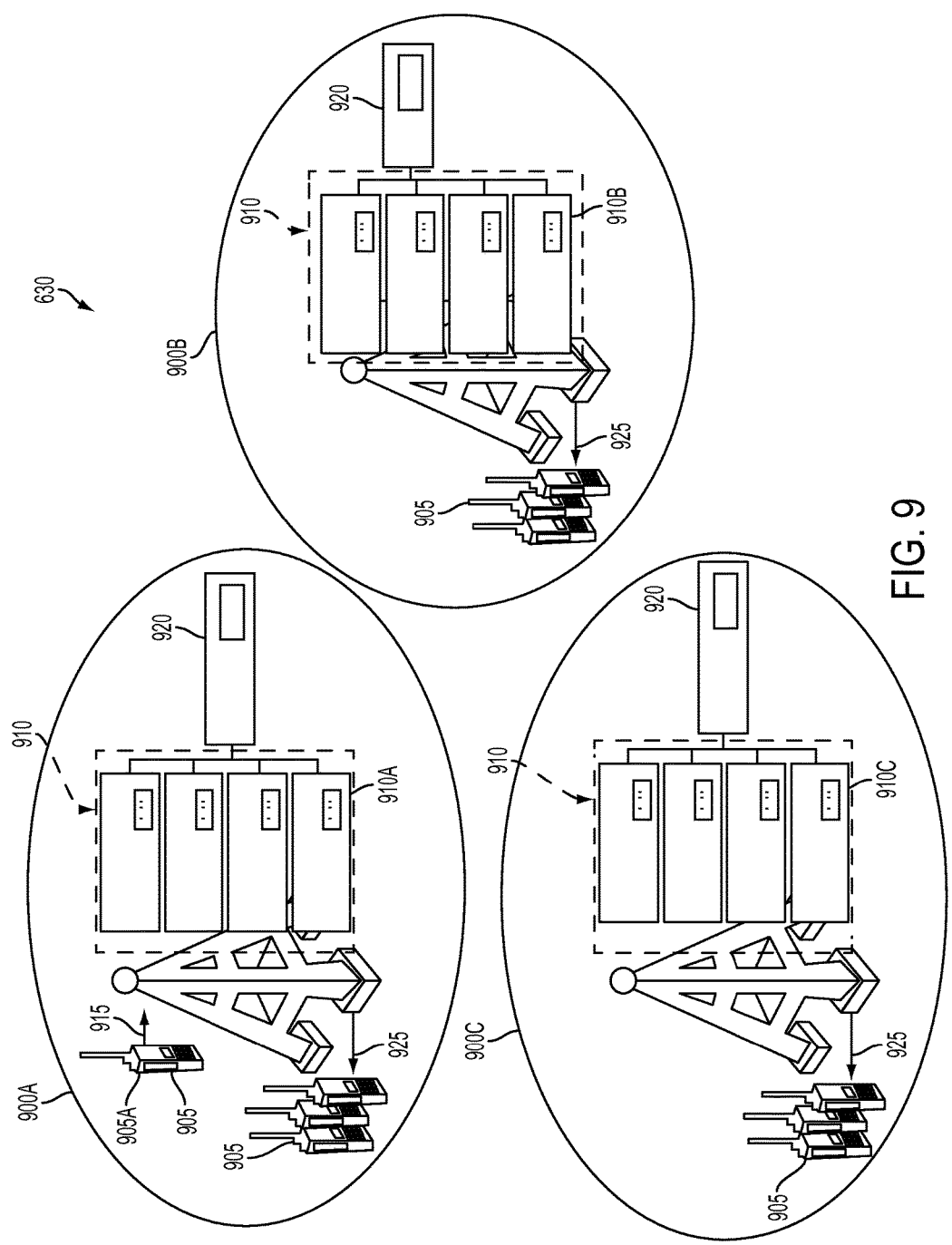
FIG. 9 illustrates an example embodiment of one of the simulcast LMR subsystems provided in the distributed architecture of FIG. 6.

Reference is now made to FIG. 9, which illustrates an example embodiment of one of the simulcast LMR subsystems 630 of FIG. 6. In the example embodiment illustrated in FIG. 9, the simulcast subsystem 630 is a trunked simulcast subsystem, which employs one simulcast control channel 915 and one or more simulcast voice channels 925 to provide trunking communication between radio users 905 within the subsystem 630. Each site 900 in the simulcast subsystem 630 includes a plurality of repeaters 910 (one to provide active or standby control channel functionality, or operations, and additional repeaters 910 for each voice channel provided in the subsystem 630), and at least one subsystem controller 920.

To provide redundancy, a single subsystem controller 920 located at one of the sites 900 is active for the entire subsystem 630, and the remaining subsystem controllers 920 located at the remaining sites 900 serve as standby. Additionally, a single repeater 910 located at one of the sites 900 is active to provide control channel functionality, or operations, and a single repeater 910 located at each of the remaining sites 900 is provided as standby in the event of failure of the active control channel repeater 910. The remaining repeaters 910 located at each of the sites are generally designated as voice channels for each of the channels provided by the subsystem 630, however, each repeater is also capable of performing voting and simulcast operations as explained below.

The trunked simulcast subsystem 630 employs both voting and simulcast operations to provide communication across the subsystem 630. In a simulcast operation, a single channel is usually provided by a collection of repeaters 910 distributed across multiple geographic sites comprising the subsystem (e.g., sites 900A, 900B, and 900C), wherein the repeaters 910 operate on the same frequency pair (transmit and receive), under voted and simulcast configurations, to expand the coverage area of the subsystem 630 into the sites (e.g., sites 900A, 900B, and 900C). In other words, in some embodiments, a single channel may be provided by one repeater 910 at each of the sites 900A-900C in the subsystem 630.

Figure 10:
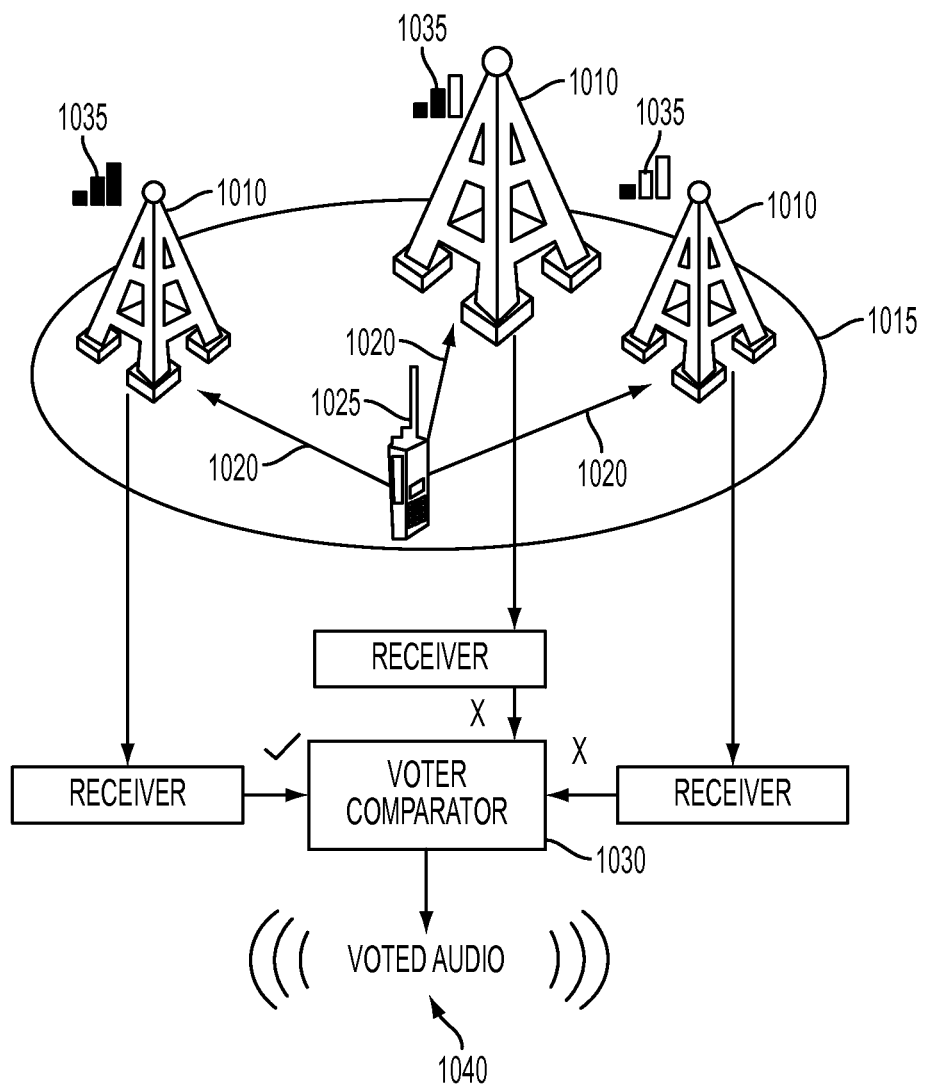
FIG. 10 illustrates an example embodiment of system for providing receiver voting in a centralized architecture.

In a traditional simulcast LMR system, the capability of a radio's communication to reach the prime site can be limited by the transmit power of the radio. One way to improve the talkback capability of the radios is to use receiver voting to determine the location (e.g., site) of the radio to determine the best means for communicating with the radio. FIG. 10 provides an example illustration of a traditional architecture for providing receiver voting. Traditionally, receiver voting is performed by placing a number of additional radio receivers (towers) 1010 in strategic locations within the simulcast system 1015 to receive the RF signal 1020 from a transmitting radio 1025. Each tower 1010 then sends the received signal and signal strength data 1035 to a voter comparator 1030. The voter comparator 1030 compares the signal strength of each received signal and selects the best signal 1040 to use for communication. The voter comparator 1030 then sends the best signal 1040 to the subsystem controller at the prime site for further processing. By increasing the number of radio receivers within a subsystem, the overall system talkback coverage area may be expanded.

In traditional systems, such as that illustrated in FIG. 10, there is one voter comparator per channel, and the voter comparator is located at a prime site or at the central network controller in a centralized LMR architecture, which may not be the same site at which the transmitting radio is located. In these traditional implementations, voter comparators present a single point of failure for a channel.

Figure 11:
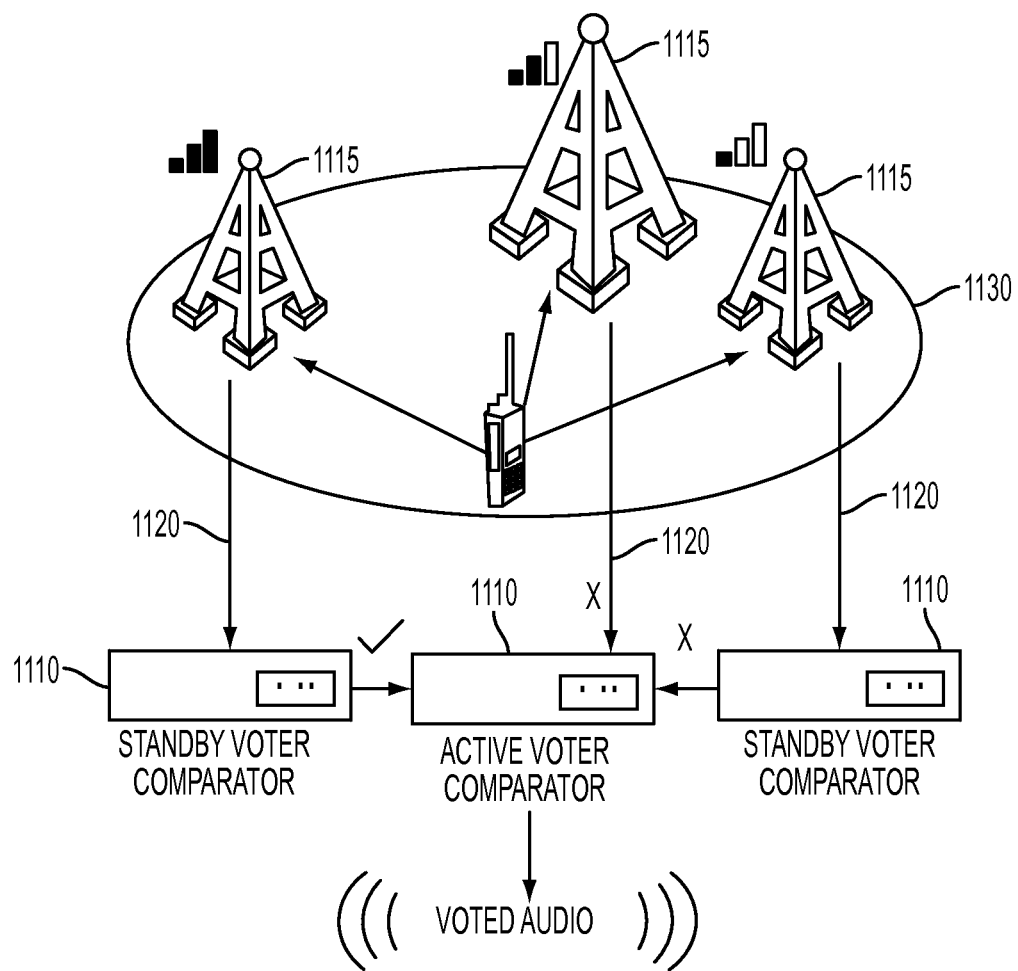
FIG. 11 illustrates an example embodiment of a system for providing receiver voting in a distributed architecture.

In accordance with an embodiment of the present disclosure, the single voter comparator is eliminated (as is the central network controller), and the voter comparator functionality is integrated into each repeater in the subsystem. For example, FIG. 11 illustrates an example of such an embodiment wherein repeaters 1110 located at different sites 1115 (similar to the repeaters 910 located at the sites 900 in FIG. 9) throughout the subsystem 1130 have integrated voter comparator functionality. Although each of the repeaters 1110 in the subsystem 1130 have voter comparator functionality, the voter comparator functionality of only one of the repeaters 1110 (for a particular channel) is configured to be active at any given time. In some embodiments, the repeaters and subsystem controllers communicate with each other to determine which repeater is active. Additionally, in some embodiments, the network management system may configure a particular repeater to be active.

The repeater 1110 with active voter comparator functionality may perform voter comparator operations, including voting of signals 1120 for all sites in the subsystem 1130 (for the particular channel assigned to the repeater 1110). The voter comparator functionality of the remaining repeaters 1110 for the channel are on standby in case of failure of the active repeater 1110. This redundancy reduces the potential of operational downtime because, if the voter comparator functionality of one repeater 1110 fails, the voter comparator functionality of another repeater 1110 will become active.

If an adequate number of frequencies are not available for communication in an LMR system, a simulcast operation may be performed to reuse frequencies and cover a large geographic area. Referring again to FIG. 9, a simulcast channel may utilize several geographically separated repeaters 910 which transmit simultaneously on the same frequency, thereby reducing the number of frequencies needed for the entire subsystem 630. For example, repeaters 910A, 910B, and 910C located at sites 900A, 900B, and 900C, respectively, may all transmit simultaneously on the same frequency to provide simulcast communication between radios in the subsystem 630.

Figure 12:
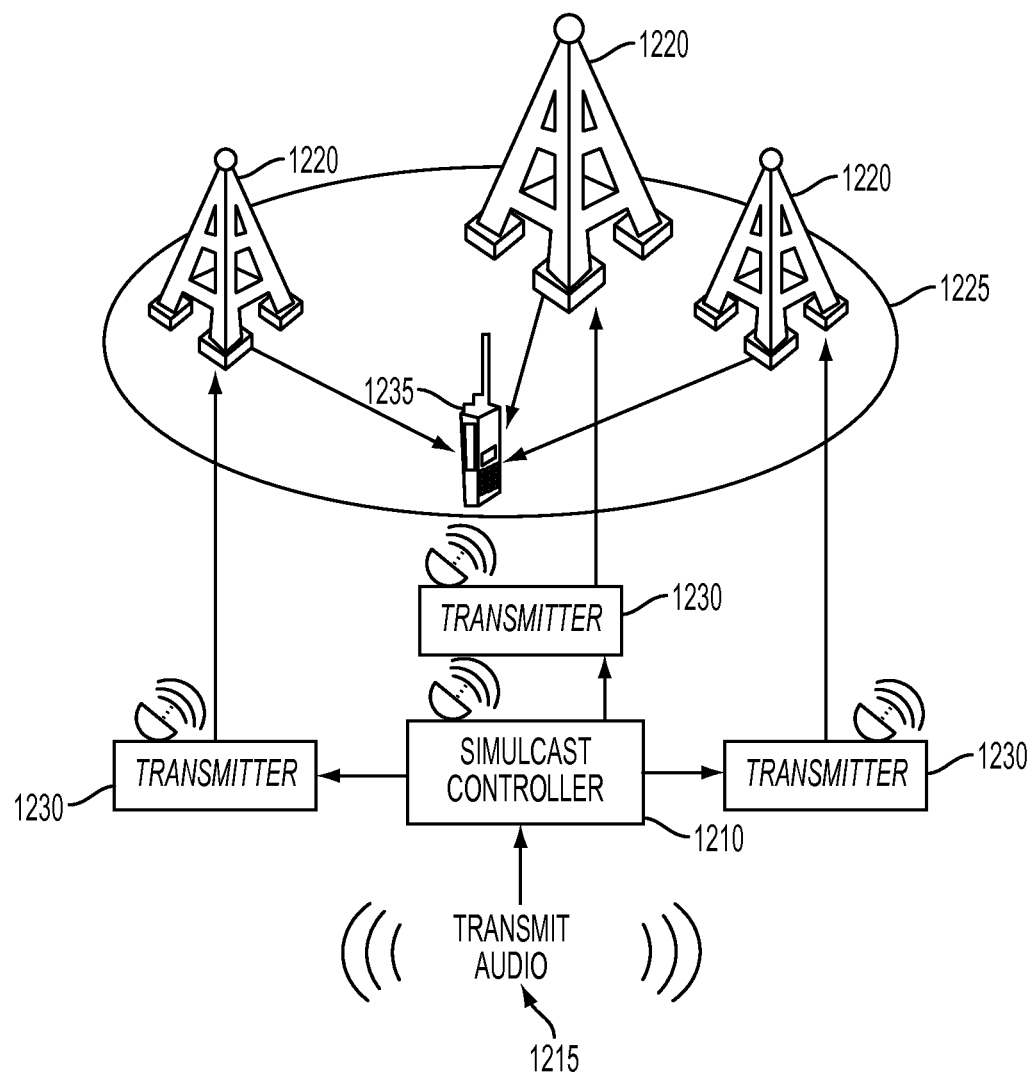
FIG. 12 illustrates an example embodiment of system for providing simulcast communication in a centralized architecture.

In a traditional simulcast LMR system, such as that illustrated in FIG. 12, a simulcast channel uses a simulcast controller 1210, which synchronizes the launch time (transmit time) of calls transmitted to sites 1220 in the system 1225. The simulcast controller 1210 receives the audio signal 1215, assigns a launch time, and then sends the signal 1215 to each transmitter/repeater 1230. Each transmitter 1230 transmits the signal at its respective site 1220 pursuant to the launch time, and radios 1235 communicating on that channel receive the signal from the multiple transmitters 1230. The timing system implemented by the simulcast controllers 1210 and transmitters 1230 synchronizes the launch time in the transmitter 1230 so that calls are transmitted simultaneously from all sites 1220 for a given repeater channel. This synchronization ensures that the transmission on the same frequency is in phase, thereby reducing interference.

In traditional simulcast LMR systems, such as that illustrated in FIG. 12, a single simulcast controller 1210 is provided for each channel. The simulcast controller 1210 is typically located at a prime site or at the central network controller in a centralized LMR architecture. Accordingly, the single simulcast controller 1210 in a traditional simulcast LMR system provides a single point of failure for a channel.

Figure 13:
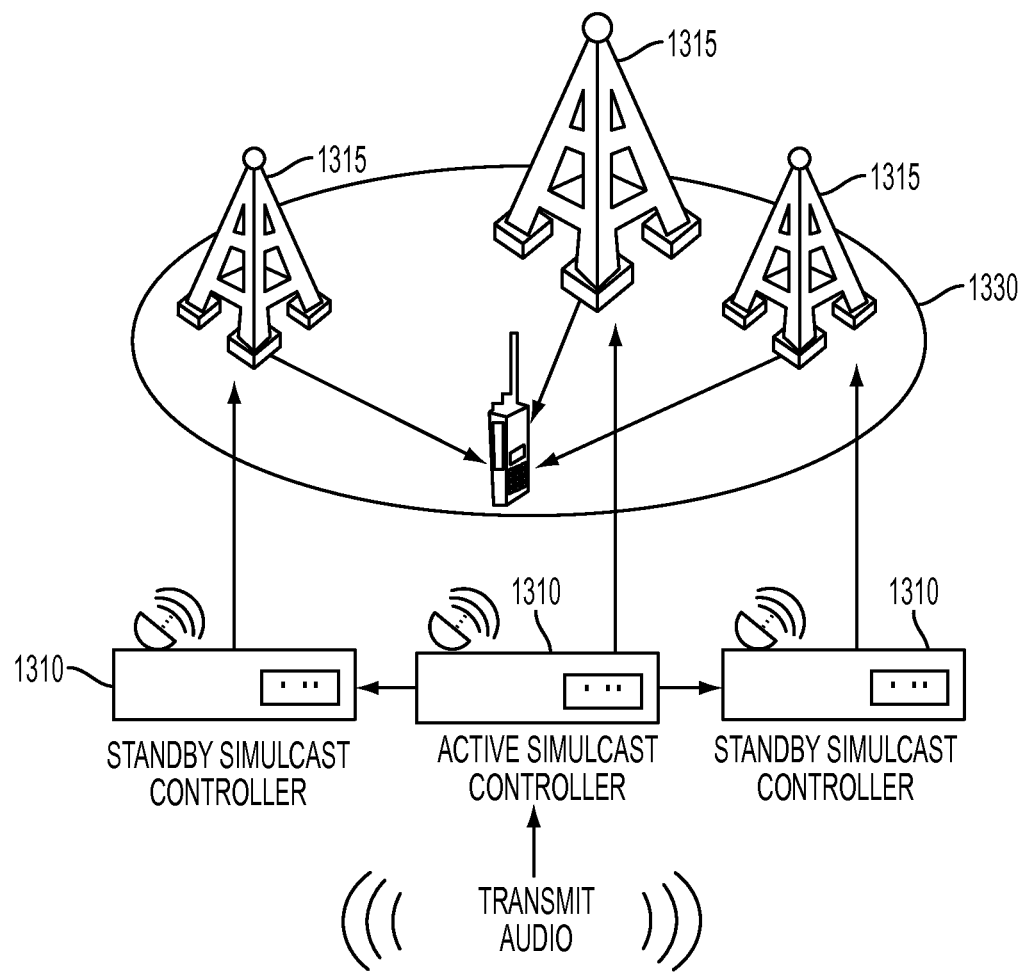
FIG. 13 illustrates an example embodiment of a system for providing simulcast communication in a distributed architecture.

In accordance with an embodiment of the present disclosure, the single simulcast controller is eliminated (as is the central network controller), and the simulcast controller functionality is integrated into each repeater in the subsystem. For example, FIG. 13 illustrates an example of such an embodiment wherein repeaters 1310 located at different sites 1315 (similar to the repeaters 910 located at the sites 900 in FIG. 9) throughout the subsystem 1330 have integrated simulcast controller functionality. Although each of the repeaters 1310 in the subsystem 1330 have simulcast controller functionality, the simulcast controller functionality of only one of the repeaters 1310 is configured to be active at any given time. In some embodiments, the repeaters and subsystem controllers communicate with each other to determine which repeater is active. Additionally, in some embodiments, the network management system may configure a particular repeater to be active.

Referring again to FIG. 9, the repeater 910 with active simulcast controller functionality may perform simulcast controller operations across all sites 900 in the subsystem 630. In some embodiments, one repeater 910 may provide simulcast controller functionality for a particular channel while other repeaters 910 allocated to that channel are on standby to provide redundancy. In other words, one repeater 910 for each channel may have active simulcast controller functionality, and the simulcast controller functionality of the remaining repeaters 910 in the subsystem 630 are on standby in case of failure of the active repeater 910 for the standby repeater's respective channel. This redundancy reduces the potential of operational downtime because, if the simulcast controller functionality of one repeater 910 fails, the simulcast controller functionality of another repeater 910 will become active.

For example, in one embodiment, repeaters 910A, 910B, and 910C are allocated to a particular channel. Repeater 910A may be active to provide simulcast controller operations for the channel allocated to repeaters 910A, 910B, and 910C, and repeaters 910B and 910C are on standby. If repeater 910A fails, repeater 910B or repeater 910C may become active to provide simulcast controller functionality for the channel allocated to repeaters 910A, 910B, and 910C.

It should be appreciated that other variations and embodiments may be considered within the scope of the present disclosure. For example, in some embodiments, one repeater 910 may provide active simulcast controller functionality for more than one channel in the subsystem 630. In this embodiment, the active simulcast repeater 910 may provide simulcast controller functionality for some, or all, of the channels in the subsystem 630. For example, repeater 910A may be allocated to a first channel, repeater 910B allocated to a second channel, and repeater 910C allocated to a third channel. Repeater 910A may provide active simulcast controller functionality for the first channel, second channel, third channel, or any combination thereof, and the remaining repeaters 910B and 910C may operate in standby mode.

In accordance with an embodiment of the present disclosure, the trunked simulcast subsystem 630 may operate in accordance with the following example call sequence discussed with reference to FIG. 9. A radio 905A initiates a call through the control channel 915. The active subsystem controller 920 (e.g., subsystem controller 920 in site 900A) processes the user-initiated call and assigns a voice channel 925 for the call. The radio users 905 communicate with each other over the voice channel 925. Any request from the initiating user 905A is received by one or more repeaters 910 of the channel, and the repeater 910 with active voter comparator functionality (e.g., repeater 910A) then performs the voter comparator operation to select the best signal. Additionally, any data packet sent to the initiating user 905A or other radio users 905 is sent to all repeaters 910 of the channel 925 through the repeater 910 with active simulcast controller functionality (e.g., repeater 910A). The repeaters 910 then simultaneously transmit the data to the radios 905 over the channel 925. In the embodiment discussed herein, both the voter comparator and simulcast controller functionality is provided by a single repeater (910A). However, it should be appreciated that, in some embodiments, the voter comparator functionality and simulcast controller functionality may be provided by separate repeaters.

Figure 14:
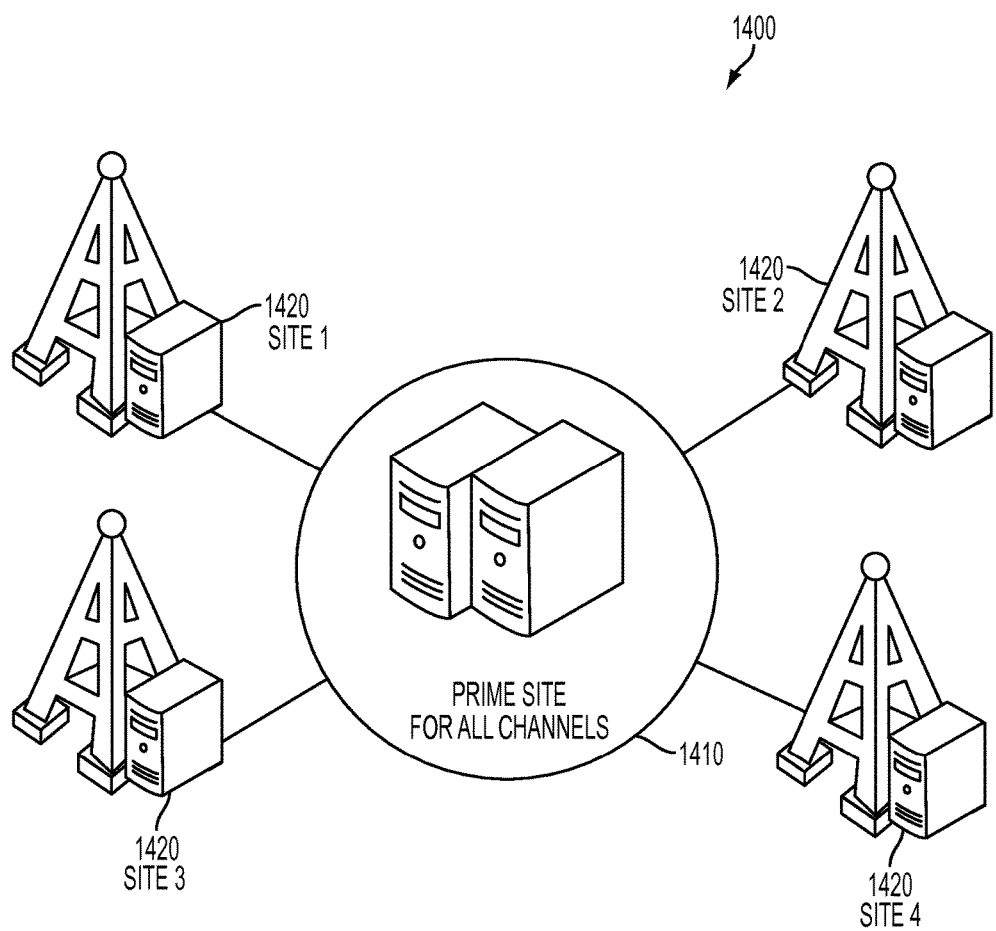
FIG. 14 illustrates an example embodiment of a centralized simulcast subsystem.

As discussed above and illustrated in FIG. 14, traditional simulcast LMR systems 1400 include a prime site 1410, which hosts voter comparators, simulcast controllers, and a simulcast subsystem controller, thereby providing simulcast synchronization and voter comparator functionality for all channels in the system 1400. The traditional simulcast LMR system 1400 embodies a centralized architecture, wherein the prime site 1410 acts as a central network controller for all sites 1420 in the system 1400. Thus, each site 1420 relies on the constant availability of the prime site 1410, and is therefore susceptible to loss of the simulcast and voter comparator functionality in the event of prime site failure.

Figure 15:
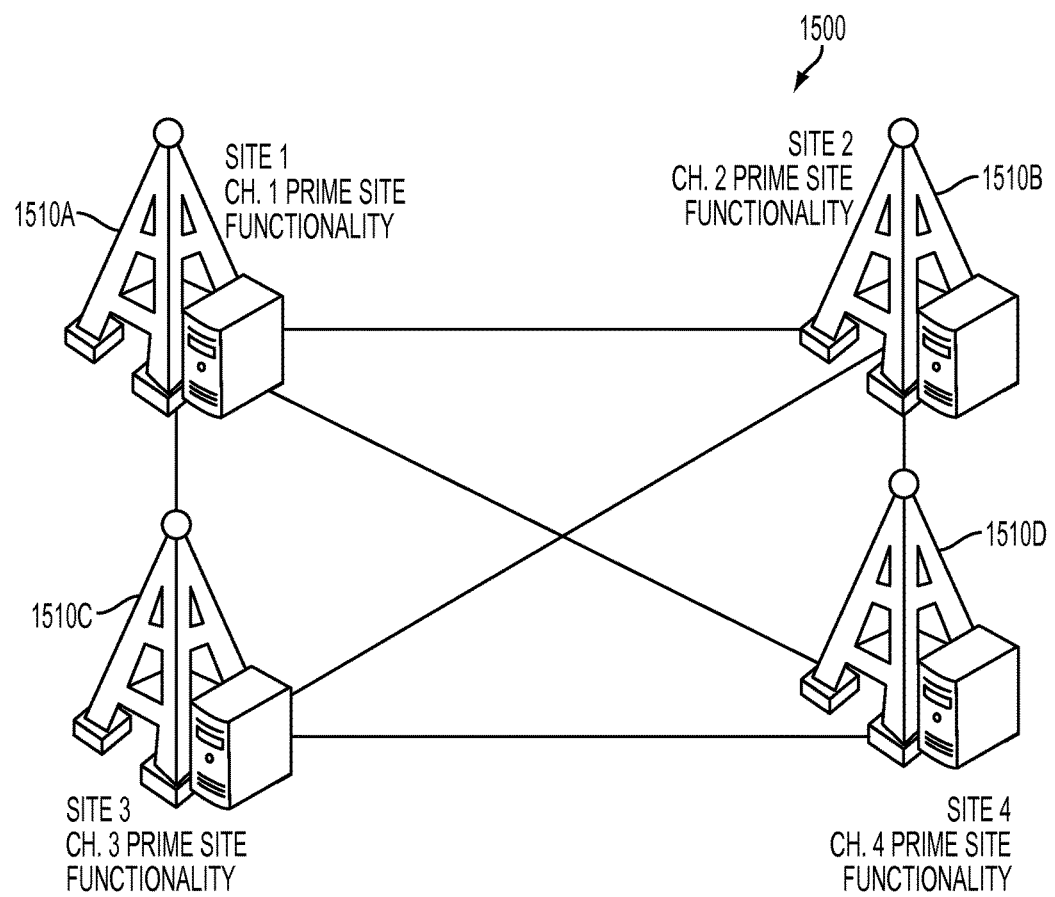
FIG. 15 illustrates an example embodiment of a trunked simulcast subsystem in a distributed architecture.

Referring now to FIG. 15, and in accordance with the forgoing discussion of the present disclosure, the trunked simulcast subsystem 1500 of the distributed LMR architecture eliminates the need for a dedicated prime site or prime site controller. The availability of simulcast controller functionality and voter comparator functionality in each repeater enables the distribution of the prime site functionality of each channel to different sites 1510 in the subsystem 1500. Accordingly, any repeater may provide prime site functionality/operations for a channel, wherein providing prime site functionality/operations for a channel includes providing simulcast controller functionality (i.e., performing simulcast controller operations) and/or providing voter comparator functionality (i.e., providing voter comparator operations) for the channel. Prime site functionality of each repeater may be assigned through configuration, or dynamically. For example, as shown in FIG. 15, a first site 1510A may provide prime site functionality for a first channel, a second site 1510B may provide prime site functionality for a second channel, a third site 1510C may provide prime site functionality for a third channel, and a fourth site 1510D may provide prime site functionality for a fourth channel. Other repeaters in the subsystem 1500 are configured as standbys and become active upon failure of the primary repeater (i.e., the repeater providing active voter comparator/simulcast controller functionality).

As illustrated in FIGS. 9 and 15, the distributed simulcast architecture also eliminates the need for a central controller to process calls. Instead, the trunked simulcast subsystem controller (920) performs control for all calls. If the primary subsystem controller fails, one of the standby subsystem controllers becomes active, thereby providing redundancy and improved reliability in comparison to a centralized architecture.

Referring briefly to FIG. 6, the dispatch centers 650 include dispatch consoles connected to other components/subsystems in the distributed LMR architecture system 600. Each console is peer to other consoles in the system 600 and is fully distributed, thereby ensuring that the impact of a console failure is localized to the corresponding dispatch center 650, and does not affect the remaining components/subsystems in the system 600.

Figure 16:
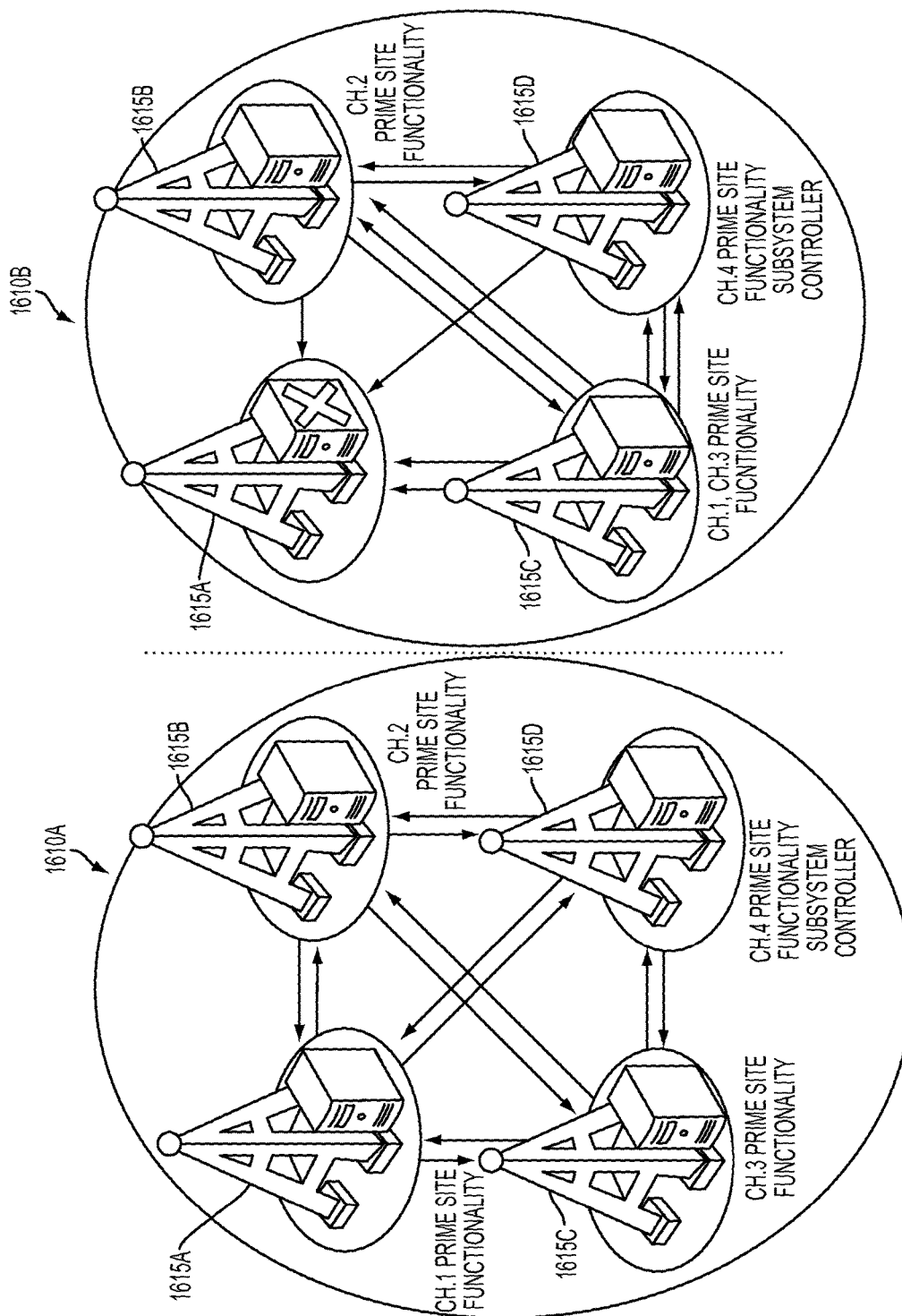
FIG. 16 illustrates an example embodiment demonstrating simulcast controller and voter comparator redundancy in a distributed simulcast LMR architecture.
Figure 17:
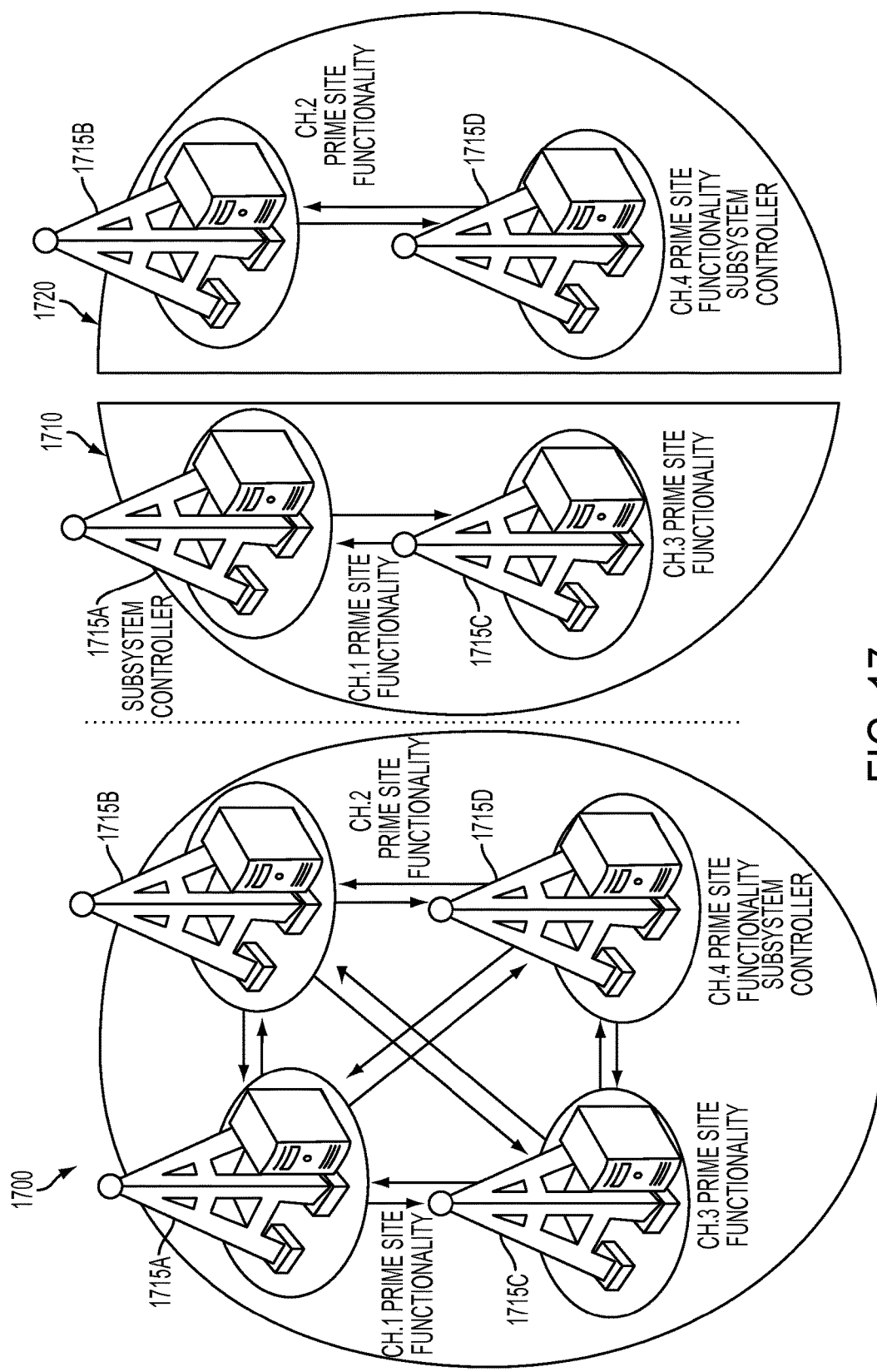
FIG. 17 illustrates an example embodiment demonstrating network failure redundancy in a distributed simulcast LMR architecture.
Figure 18:
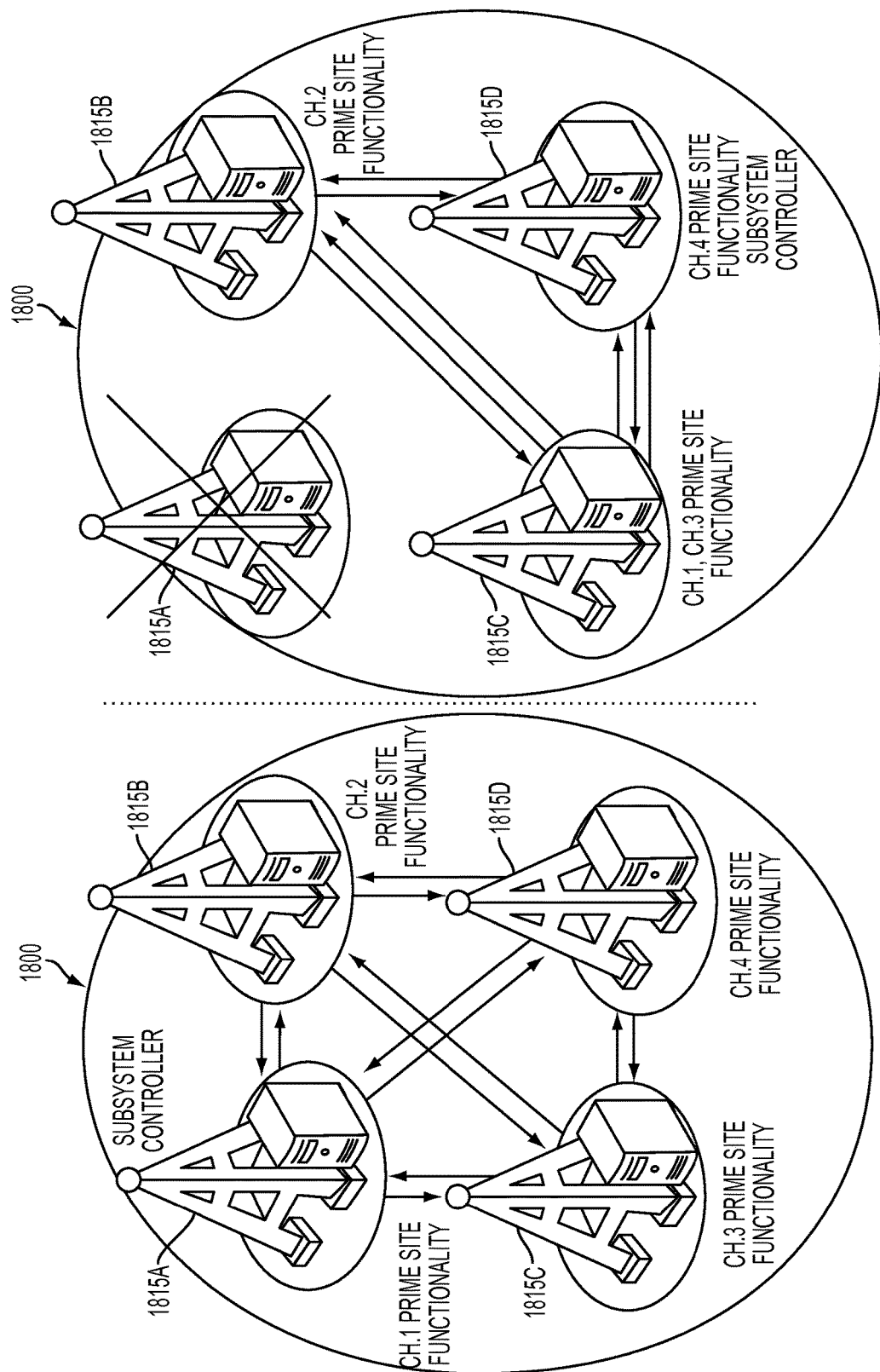
FIG. 18 illustrates an example embodiment demonstrating site redundancy in a distributed simulcast LMR architecture.

Reference is now made to FIGS. 16-18, which are provided in support of the following description of various redundancy advantages provided by the disclosed distributed simulcast LMR architecture. Specifically, the disclosed distributed simulcast architecture provides redundancy in at least three aspects: (i) simulcast controller and voter comparator redundancy, (ii) network failure redundancy, and (iii) site redundancy.

FIG. 16 illustrates an example embodiment demonstrating simulcast controller and voter comparator redundancy in the disclosed distributed simulcast LMR architecture. As illustrated in the example embodiment in FIG. 16, simulcast controller functionality and voter comparator functionality is shown distributed between multiple simulcast sites 1615 in a distributed simulcast subsystem 1610. In the subsystem 1610A, sites 1615A, 1615B, 1615C, and 1615D provide prime site functionality for channels one, two, three, and four, respectively, and site 1615D also provides the active subsystem controller. In subsystem 1610B, the repeater providing the simulcast controller/voter comparator functionality at site 1615A fails, and the prime site functionality for channel one changes to one of the standby repeaters located at one of the other sites. In this example, site 1615C assumes prime site functionality for channel one. As shown in the subsystem 1610B, site 1615C provides prime site functionality for channels one and three. In the embodiment illustrated in FIG. 16, the subsystem controller location at site 1615D remains unchanged.

FIG. 17 illustrates an example embodiment demonstrating network failure redundancy in the disclosed distributed simulcast LMR architecture. In FIG. 17, a trunked simulcast subsystem 1700 includes sites 1715A, 1715B, 1715C, and 1715D providing prime site functionality for channels one, two, three, and four, respectively, and site 1715D also providing the active subsystem controller for the subsystem 1700. As illustrated in FIG. 17, if a network failure breaks the trunked simulcast subsystem 1700 into halves 1710 and 1720, each half becomes a smaller simulcast subsystem.

One of the subsystem controllers in each of the smaller subsystems 1710 and 1720 becomes active and continues to provide user communication on a reduced number of channels. For example, in the first reduced subsystem 1710, the subsystem controller at site 1715A becomes active and provides call control functionality for sites 1715A and 1715C. In the second reduced subsystem 1720, the subsystem controller at site 1715D remains active and provides call control functionality for sites 1715B and 1715D. This built-in redundancy ensures that users in each half 1710 and 1720 can still communicate with each other without interfering with RF signals in the overlapping area.

FIG. 18 illustrates an example embodiment demonstrating site redundancy in the disclosed distributed simulcast LMR architecture. In FIG. 18, a trunked simulcast subsystem 1800 includes sites 1815A, 1815B, 1815C, and 1815D providing prime site functionality for channels one, two, three, and four, respectively, and site 1815A also providing the active subsystem controller for the subsystem 1800. Site redundancy is enabled by the combination of redundant simulcast controller functionality and voter comparator functionality in each repeater and a redundant subsystem controller at each site 1815. Therefore, in case of a catastrophic failure of a site 1815, the rest of the sites 1815 continue to provide coverage with little impact on the subsystem 1800. For example, as shown in FIG. 18, if site 1815A experiences a catastrophic failure, one of the standby repeaters located at one of the other sites (in this example, site 1815C) is activated and assumes prime site functionality for channel one. Additionally, one of the standby subsystem controllers located at one of the other sites (in this example, site 1815D) is activated and becomes the subsystem controller for the subsystem 1800.

When compared to centralized LMR system architecture and traditional simulcast LMR systems, the foregoing disclosure of the distributed simulcast architecture provides various advantages and benefits. For example, the disclosed system provides increased reliability because the removal of a prime site eliminates the single-point-of-failure structure provided in a traditional simulcast system. Furthermore, distributing the functionality of the prime site to the various sites and equipment comprising the distributed simulcast subsystem reduces costs and maintenance required to maintain the system. Additionally, providing a subsystem controller at each site in the subsystem offers multiple levels of redundancy of the controller, and affords communication throughout the subsystem even in the event of various failures. Finally, providing voter comparator and simulcast controller functionality in each repeater provides N times the voter/simulcast controller availability in a traditional simulcast system, where N represents the number of sites in the subsystem. This also allows redundancy of voter comparator functionality and simulcast controller functionality within a site or across multiple sites (to survive network failure, site failure, or equipment failure), thereby providing communication in the event of multiple failures, and providing automatic and dynamic tuning of transmission launch time.

A number of additional and alternative embodiments of the disclosed system and method may be provided without departing from the spirit or scope of the present disclosure as set forth in the claims provided herein. These various embodiments are believed to be understood by one of ordinary skill in the art in view of the present disclosure.

What is claimed is:

1. A system for providing communication in a distributed land mobile radio (LMR) system architecture, the distributed LMR system architecture comprising one or more subsystems in communication with a data network, the system comprising:
one or more LMR sites for providing radio communication among land mobile radios associated with the system, the one or more LMR sites comprising at least one of the one or more subsystems;
one or more subsystem controllers disposed at each of the one or more LMR sites comprising the at least one subsystem, each subsystem controller having at least an active mode and a standby mode, wherein at least one subsystem controller is operable in the active mode to control communication between one or more of the land mobile radios and to control communication between the one or more LMR sites in the at least one subsystem; and one or more repeaters disposed at each of the plurality of LMR sites in the at least one subsystem, each of the repeaters operable to provide a communication channel for at least one of the land mobile radios to communicate with one or more of the LMR sites in the system, wherein each repeater has at least an active mode and a standby mode, and wherein at least one repeater is operable in the active mode to initiate at least one of a voter comparator operation and a simulcast controller operation using a simulcast controller, and wherein the simulcast controller operation includes assigning a launch time, and sending a signal to repeaters sharing a given repeater channel at other LMR sites whereby a radio call is transmitted simultaneously at the assigned launch time and in phase by the repeaters sharing the given repeater channel.

2. The system as set forth in claim 1, wherein the voter comparator operation includes comparing a strength of one or more received signals to determine a strongest signal to use for communication among two or more land mobile radios associated with the system.

3. The system as set forth in claim 1, wherein a repeater in the active mode is configurable to perform the simulcast controller operation for the communication channel provided by the repeater in the active mode.

4. The system as set forth in claim 1, wherein a repeater in the active mode is configurable to perform the simulcast controller operation for a communication channel provided by a different repeater.

5. The system as set forth in claim 4, wherein the communication channel provided by the repeater in the active mode is a first frequency, and the communication channel provided by the different repeater is a second frequency different than the first frequency.

6. The system as set forth in claim 1, wherein repeaters in a standby mode are configurable to switch to the active mode upon failure of a repeater operating in the active mode.

7. The system as set forth in claim 1, wherein subsystem controllers in a standby mode are configurable to switch to the active mode upon failure of a subsystem controller operating in the active mode.

8. The system as set forth in claim 1, wherein subsystem controllers in a standby mode are configurable to switch to the active mode upon failure of at least a portion of the one or more sites comprising a subsystem controller operating in the active mode.

9. The system as set forth in claim 1, wherein the subsystem controller is further configurable to provide communication between two or more subsystems comprising the distributed LMR system architecture.

10. The system as set forth in claim 1, wherein the data network is an Internet Protocol network.

11. The system as set forth in claim 1, wherein the at least one subsystem is a simulcast subsystem.

12. A method for providing communication in a distributed land mobile radio (LMR) system architecture, the distributed LMR system architecture comprising one or more subsystems in communication with a data network, the method comprising:

providing a plurality of LMR sites for providing radio communication among land mobile radios associated with the distributed LMR system architecture, the plurality of LMR sites comprising at least one of the one or more subsystems;

providing a subsystem controller in each of the plurality of LMR sites comprising one of the subsystems, each subsystem controller having at least an active mode and a standby mode;

operating one of the subsystem controllers in the active mode to control communication between the plurality of LMR sites and to control communication between one or more of the land mobile radios;

operating the remaining subsystem controllers in the standby mode;

providing a plurality of repeaters at each of the plurality of LMR sites comprising the subsystem, each repeater having at least an active mode and a standby mode;

operating at least one of the repeaters in the active mode to perform at least one of a simulcast controller operation and a voter comparator operation;

operating the remaining repeaters in the standby mode, and wherein the simulcast controller operation comprises assigning a launch time, and sending a signal to repeaters sharing a given repeater channel at other LMR sites whereby a radio call is transmitted simultaneously at the assigned launch time and in phase by the repeaters sharing the given repeater channel.

13. The method as set forth in claim 12, wherein performing the voter comparator operation includes comparing a strength of one or more received signals to determine a strongest signal to use for communication among two or more land mobile radios associated with the distributed LMR system architecture.

14. The method as set forth in claim 12, further comprising providing a communication channel via one or more of the repeaters.

15. The method as set forth in claim 14, further comprising performing the simulcast controller operation for a communication channel provided by the repeater operating in the active mode.

16. The method as set forth in claim 14, further comprising performing the simulcast controller operation for a communication channel provided by a different repeater.

17. The method as set forth in claim 16, wherein the communication channel provided by the repeater operating in the active mode is a first frequency, and the communication channel provided by the different repeater is a second frequency different than the first frequency.

18. The method as set forth in claim 12, further comprising switching a repeater from the standby mode to the active mode upon failure of a repeater operating in the active mode.

19. The method as set forth in claim 12, further comprising switching a subsystem controller from the standby mode to the active mode upon failure of a subsystem controller operating in the active mode.

20. The method as set forth in claim 12, further comprising switching a subsystem controller from the standby mode to the active mode upon failure of the LMR site comprising a subsystem controller operating in the active mode.

21. The method as set forth in claim 12, further comprising providing communication, via a subsystem controller, between two or more subsystems comprising the distributed LMR system architecture.

22. The method as set forth in claim 12, wherein the subsystem is a simulcast subsystem.

* * * * *